(12) United States Patent
Fine et al.

(10) Patent No.: US 9,779,463 B2
(45) Date of Patent: Oct. 3, 2017

(54) LOCAL MANAGEMENT FOR INTERMEDIARY GRAPHICS RENDITION

(71) Applicant: EMPIRE TECHNOLOGY DEVELOPMENT LLC, Wilmington, DE (US)

(72) Inventors: Kevin Fine, Yverdon-les-Bains (CH); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/380,908

(22) PCT Filed: Feb. 11, 2014

(86) PCT No.: PCT/US2014/015776
§ 371 (c)(1),
(2) Date: Aug. 25, 2014

(87) PCT Pub. No.: WO2015/060889
PCT Pub. Date: Apr. 30, 2015

(65) Prior Publication Data
US 2016/0292810 A1    Oct. 6, 2016

Related U.S. Application Data

(63) Continuation-in-part of application No. PCT/US2013/066300, filed on Oct. 23, 2013.

(51) Int. Cl.
*G06T 1/00* (2006.01)
*G06T 1/20* (2006.01)
(Continued)

(52) U.S. Cl.
CPC ............... *G06T 1/20* (2013.01); *G06F 9/50* (2013.01); *G06T 15/005* (2013.01);
(Continued)

(58) Field of Classification Search
CPC ..... G06T 19/00; G06T 2200/16; G06T 17/00; G06F 17/30899; G06F 2209/509; G06F 3/1454; G09G 2370/022
See application file for complete search history.

(56) References Cited

U.S. PATENT DOCUMENTS 5,682,506 A    10/1997 Corby, Jr. et al.
7,092,983 B1    8/2006 Tyrrell, III
(Continued)

FOREIGN PATENT DOCUMENTS

EP    2451184 A1    5/2012

OTHER PUBLICATIONS

"Amazon Simple Storage Service (Amazon S3)," accessed at http://web.archive.org/web/20131022024349/http://aws.accessed on May 20, 2014, 7 pages.
(Continued)

*Primary Examiner* — Hau Nguyen
(74) *Attorney, Agent, or Firm* — Jensen & Puntigam, PS

(57) ABSTRACT

Technologies related to intermediary graphics rendition are generally described. In some examples, one or more devices in a local network may be equipped to serve as real-time graphics rendering intermediary computing devices for clients in the local network. A graphics rendering manager for the local network may collect graphics processing capability information of the devices in a local network, and may select computing device(s) in the local network to serve as intermediary computing device(s). The graphics rendering manager may interact with a system controller at a server or datacenter to direct compositing flow(s) to the selected computing device(s), responsive to system controller requests to initiate intermediary graphics rendering for clients in the local network.

20 Claims, 12 Drawing Sheets

(51) Int. Cl.
*G06F 9/50* (2006.01)
*G06T 15/00* (2011.01)
*H04N 21/426* (2011.01)
*H04L 29/06* (2006.01)
*H04L 29/08* (2006.01)

(52) U.S. Cl.
CPC ........ *H04L 65/605* (2013.01); *H04L 67/2823* (2013.01); *H04L 67/42* (2013.01); *H04N 21/42653* (2013.01); *H04L 65/80* (2013.01)

(56) References Cited

U.S. PATENT DOCUMENTS

| | | |
|---|---|---|
| 2008/0204460 A1 | 8/2008 | Marinkovic et al. |
| 2009/0125961 A1 | 5/2009 | Perlman et al. |
| 2011/0304634 A1 | 12/2011 | Urbach |
| 2012/0165101 A1 | 6/2012 | Krishnamoorthy et al. |
| 2013/0050063 A1 | 2/2013 | Poornachandran et al. |
| 2013/0147818 A1 | 6/2013 | Kuo et al. |
| 2013/0212538 A1 | 8/2013 | Lemire et al. |
| 2013/0215110 A1 | 8/2013 | Rivera et al. |
| 2014/0207911 A1* | 7/2014 | Kosmach ................ H04L 67/02 709/218 |

OTHER PUBLICATIONS

AMD FirePro™ R5000 Remote Graphics, accessed at http://www.amd.com/us/products/workstation/graphics/firepro-remote-graphics/r5000/Pages/r5000.aspx, accessed on Aug. 13, 2013, 2 pages.
"AMD Stream processors," accessed at http://www.newegg.com/Product/ProductList.aspx?Submit=ENE&DEPA=0&Order=bestmatch&N=-1&isNodeId=1&Description=AMD+Stream+processors&x=-975&y=-112, accessed on Aug. 11, 2014, pp. 4.
Onlive, "About the OnLive Game Service" accessed at http://games.onlive.com/about, 3 pages (Aug. 13, 2013).
"How many hours of HD-video can you get per each GB?," accessed at http://www.tomshardware.co.uk/forum/299995-30-hours-video, Aug. 4, 2012, 3 pages.
Wikipedia, "Intel Quick Sync Video," accessed at http://web.archive.org/web/20131213100902/http://en.wikipedia.org/wiki/Intel_Quick_Sync_Video, accessed on Aug. 8, 2014, 5 pages.
Wikipedia, "Level 3 Communications," accessed at http://en.wikipedia.org/wiki/Level_3_Communications, accessed on Aug. 13, 2013, 5 pages.
"NVIDIA Geforce Grid Processors," accessed at http://web.archive.org/web/20130422105738/http://www.nvidia.com/object/grid-processors-cloud-games.html, accessed on Aug. 8, 2014, pp. 3.
"The Daedalus Gateway: The Psychology of MMORPGs," accessed at http://www.nickyee.com/daedalus/gateway_demographics.html, accessed on Aug. 13, 2013, 1 page.
Wikipedia,"Wireless Gigabit Alliance ," IEEE 802.11ad, accessed at http://web.archive.org/web/20131029224235/https://en.wikipedia.org/wiki/IEEE_802.11ad, accessed on Aug. 8, 2014, 9 pages.
Alexander, K., "The Future of Cloud Gaming Is . . . Still Cloudy," accessed at https://blogs.akamai.com/2012/08/the-future-of-cloud-gaming-isstill-cloudy.html, Aug. 24, 2012, 2 pages.
Brodkin, J., "NVIDIA virtualizes the GPU for streamed desktops and cloud gaming," accessed at http://arstechnica.com/gaming/2012/05/nvidia-virtualizes-the-gpu-for-streamed-desktops-and-cloud-gaming/, 4 pages (May 15, 2012).
Bylund, A., "The Real Reason Netflix Invests in Network Tech," accessed at http://www.fool.com/investing/general/2013/01/09/the-real-reason-netflix-invests-in-network-tech.aspx, 2 pages (Jan. 9, 2013).
Choy, S. et al., "The brewing storm in cloud gaming: A measurement study on cloud to end-user latency," 11th Annual Workshop on Network and Systems Support for Games, 6 pages (2012).
Demerjian, C., "AMD announces SKY, the new cloud gaming line: GDC 2013: Shock of the year, AMD nails marketing," accessed at http://semiaccurate.com/2013/03/27/amd-announces-sky-the-new-cloud-gaming-line/, 5 pages (Mar. 27, 2013).

Eisert, P., and Fechteler, P., "Remote Rendering of Computer Games," International Conference on Signal Processing and Multimedia Applications (SIGMAP), pp. 6 (2007).
Flora, D., "High Performance Cloud Streaming: A Game Changer," accessed at www.cdn.net/blog/2013/05/high-performance-cloud-streaming-a-game-changer/, 5 pages (May 20, 2013).
Fritz, B., "Netflix streams more than 1 billion hours in June," accessed at http://articles.latimes.com/2012/jul/03/entertainment/la-et-ct-netflix-billion-hours-20120703, 2 pages (Jul. 3, 2012).
Gallegos, A., "Gaikai Integrated with PlayStation 4: Sony is putting Gaikai to good use," accessed at http://www.ign.com/articles/2013/02/20/playstation-cloud-revealed, 15 pages (Feb. 20, 2013).
Grabham, D., "How Nvidia Grid is set to revolutionise cloud gaming," accessed at http://web.archive.org/web/20131109050512/http://www.techradar.com/news/computing/servers/how-nvidia-grid-is-set-to-revolutionise-cloud-gaming-1167986, posted on Jul. 24, 2013, 8 pages.
Guo, K., "A Novel Matching Algorithm to 3D Incomplete Object," Journal of Computational Information Systems, vol. 7, Issue 1, pp. 73-79 (2011).
International Searching Authority, International Search Report and Written Opinion for International Application No. PCT/US2013/066300, 16 pages (Apr. 16, 2014).
International Searching Authority, International Search Report with Written Opinion for International Application No. PCT/US2014/015776, 11 pages (Jul. 8, 2014).
Islam, Z., "Nvidia Reveals More About Cloud Gaming Service: Grid," accessed at http://www.tomshardware.com/news/Nvidia-Grid-Cloud-Gaming-Service,20256.html, Jan. 8, 2013, 3 pages.
Johnson, E., "Mobile garners with better phone screens spend more on in-app purchases," accessed at http://allthingsd.com/20130321/mobile-gamers-with-better-phone-screens-spend-more-on-in-app-purchases/, Mar. 21, 2013, 3 pages.
Khan, A. and Buyya, R., "A Taxonomy and Survey of Content Delivery Networks," Grid Computing and Distributed Systems (Grids) Laboratory, Department of Computer Science and Software Engineering University of Melbourne, Parkville, VIC 3010, Australia, pp. 1-44 (2007).
Lawler, R., "Netflix Rolls Out Its Own CDN: Open Connect," posted Jun. 4, 2012, accessed at http://web.archive.org/web/20130905013131/http://techcrunch.com/2012/06/04/netflix-open-connect, accessed on Aug. 11, 2014, pp. 2.
Molnar, S., et al., "A sorting classification of parallel rendering," Article in ACM SIGGRAPH Asia 2008 courses, pp. 1-11 (2008).
Negishi, M., "How Nintendo got upended by 'Puzzle & Dragons'," Wall Street Journal Article, accessed at http://web.archive.org/web/20131231023908/http://online.wsj.com/news/articles/SB10001424127887324904004578535511438819762, Jun. 11, 2013, 2 pages.
Petitte, O., "Diablo III sales and World of Warcraft subscriber count revealed in Activision earnings report," accessed at http://www.pcgamer.com/2013/02/08/diablo-iii-world-of-warcraft-activision, 6 pages (Feb. 8, 2013).
Rao, L., "Cloud-Based Game Streaming Service Gaikai Raises $30M From Qualcomm, NEA and Others," accessed at http://techcrunch.com/2011/07/20/cloud-based-game-streaming-service-gaikai-raises-30m-from-qualcomm-nea-and-others/, 2 pages (Jul. 20, 2011).
Samanta, R. et al., "Parallel rendering with k-way replication," Article in Proceedings of the IEEE 2001 symposium on parallel and large-data visualization and graphics, pp. 75-84 (2001).
Shimpi, A. L., "Intel Iris Pro 5200 Graphics Review: Core i7-4950HQ Tested," accessed at http://web.archive.org/web/20140209075820/http://www.anandtech.com/show/6993/intel-iris-pro-5200-graphics-review-core-i74950hq-tested, Jun. 1, 2013, 4 pages.
Simpson, C., "Samsung's Galaxy S4 has a next-gen video codec," accessed at http://web.archive.org/web/20131023061050/http://www.pcworld.idg.com.au/article/456443/samsung_galaxy_s4_has_next-gen_video_coded, Mar. 15, 2013, 7 pages.

(56) References Cited

OTHER PUBLICATIONS

Takahashi, D., "Nvidia poised to change gaming with cloud graphics chips," accessed at http://venturebeat.com/2012/05/15/nvidia-tailors-its-graphics-chip-for-cloud-based-gaming/, 5 pages (May 15, 2012).

Tassi, P., "Google and Apple may bring us a console war we didn't see coming," Forbes Article, accessed at http://web.archive.org/web/20131207045117/http://www.forbes.com/sites/insertcoin/2013/06/28/google-and-apple-may-bring-us-a-console-war-we-didnt-see-coming/, Jun. 28, 2013, 8 pages.

Terashima, N., et al., "Experiment of Virtual Space Distance Education System Using the Objects of Cultural Heritage," Article in IEEE International Conference on Multimedia Computing and Systems, vol. 2, pp. 153-157 (1999).

Turner, R., "Nvidia enables GPU virtualization and talks up cloud for gaming and VDI," accessed at http://ovum.com/2012/05/28/nvidia-enables-gpu-virtualization-and-talks-up-cloud-for-gaming-and-vdi/, 10 pages (May 28, 2012).

Wang, J., "NVIDIA GeForce Grid—A Glimpse at the Future of Gaming," accessed at http://www.geforce.com/whats-new/articles/geforce-grid, 10 pages (May 15, 2012).

Yahyavi, A., and Kemme, B., "Peer-to-peer architectures for massively multiplayer online games: A survey," ACM Computing Surveys, vol. 46, No. 1, Article No. 9 (2013).

Akamai, "Investor Summit: 2013" Slide presentation, 210 pages (Sep. 2013).

Groff, "An intro to modern OpenGL. Chapter 1: The Graphics Pipeline," accessed at http://duriansoftware.com/joe/An-intro-to-modern-OpenGL-Chapter-1:-The-Graphics-Pipeline.html, 9 pages (Apr. 5, 2010).

Pathan, A-M.K., et al., "A Taxonomy and Survey of Content Delivery Networks," Article in Lecture Notes Electrical Engineering, vol. 9, 44 pages (2008).

Wikipedia, "Content delivery network," accessed at http://en.wikipedia.org/wiki/Content_delivery_network, 7 pages (Sep. 10, 2013).

\* cited by examiner

MODEL 701    MODEL 702    MODEL 703

FRAME 1:
MODEL 701; POSITION X1, Y1; ORIENTATION O1;
MODEL 703; POSITION X2, Y2; ORIENTATION O2;
FRAME 2:
MODEL 701; POSITION X3, Y3; ORIENTATION O3;
MODEL 703; POSITION X4, Y4; ORIENTATION O4;
MODEL 702; POSITION X5, Y5; ORIENTATION O5;
...

COMPOSITING FLOW 710

FRAME 1    FRAME 2

RENDERED GRAPHICS STREAM 720

LOCAL MANAGEMENT FOR INTERMEDIARY GRAPHICS RENDITION

CROSS-REFERENCE TO RELATED APPLICATIONS

This application is a U.S. National Stage filing under 35 U.S.C. §371 of International Application No. PCT/US14/15776, entitled "LOCAL MANAGEMENT FOR INTERMEDIARY GRAPHICS RENDITION", filed on Feb. 11, 2014, which in turn is a continuation in part application claiming priority under 35 U.S.C. §120 to International Application No. PCT/US13/66300, entitled "INTERMEDIARY GRAPHICS RENDITION", filed on Oct. 23, 2013.

BACKGROUND

Unless otherwise indicated herein, the materials described in this section are not prior art to the claims in this application and are not admitted to be prior art by inclusion in this section.

Graphics rendering typically involves generating images and/or video. For example, video games generally involve real-time graphics rendering to generate video as a video game is played. The generated video may reflect, for example, video game objects and scenery as a player interacts with a video game environment, as well as player actions, actions of multiple other players in a multi-player game, and/or other actions or events that may occur in the video game environment. Real-time graphics rendering may also be performed in a wide variety of other, non-video game applications.

A large amount of the video currently streamed over the Internet is not rendered in real-time, or may have been recorded without any graphics rendering at all. For example, many videos available from websites such as YOUTUBE®, news websites, social network websites, and a great many other websites, as well as movies and television shows available from services such as NETFLIX®, include pre-recorded or otherwise previously rendered videos that may be streamed without real-time graphics rendering operations. Such videos may be streamed to client devices directly from datacenters that host the websites or services themselves, such as the datacenters hosting the YOUTUBE® website or the NETFLIX® service, or such videos may be streamed to client devices from any of multiple distributed Content Delivery Network (CDN) servers deployed in multiple data centers across the Internet. By storing video files at distributed CDN servers, network loads and costs associated with data delivery can be reduced.

Furthermore, pre-recorded or otherwise previously rendered videos delivered to a client device may optionally be stored at the client device, or within a Local Area Network (LAN) to which the client device may be connected, for subsequent replay. Such local storing and subsequent replay operations may also be accomplished without need for any real-time graphics rendering operations.

Meanwhile, video content that is rendered in real-time or near real-time prior to streaming is currently limited to streaming from datacenters hosting the website or service that interacts with the client. Because it is rendered in real-time, such video content also cannot be usefully stored in a LAN for subsequent replay. For example, a multiplayer video game application may render graphics at a central datacenter, and may stream real-time rendered video content from the central datacenter hosting the video game application to the various client devices operated by players of the video game. Datacenter or cloud-based applications that conduct real-time graphics rendering for multiplayer games are currently unable to leverage devices other than those at the central datacenter for delivery of real-time rendered video. One result is that real-time rendered video content may on average travel longer network distances than pre-recorded video content; real-time rendered video content may on average travel across more expensive network infrastructure than pre-recorded video content; and real-time rendered video content may on average travel across network infrastructure that is burdened with higher loads than the network infrastructure carrying pre-recorded video content.

SUMMARY

The present disclosure generally describes technologies including devices, methods, and computer readable media relating to intermediary graphics rendition, and local management for intermediary graphics rendition. Some example methods may comprise rendering graphics by an intermediary computing device. Example methods may include storing one or more graphics models in a model store; receiving, via a network, session information from a server computing device, the session information identifying a client device; receiving, via the network, a compositing flow provided by the server, wherein the compositing flow may comprise, e.g., model identifiers and model rendering information, wherein the model rendering information comprises at least model position information; retrieving models identified in the compositing flow from the model store; and providing the identified models from the model store and the model rendering information to a Graphics Processing Unit (GPU) for rendering, thereby causing the GPU to render graphics for delivery to the client device. The rendered graphics for delivery to the client device may comprise the identified models from the model store positioned according to the model rendering information in the compositing flow.

Some example methods may comprise providing a compositing flow to an intermediary computing device by a server computing device, wherein the intermediary computing device is adapted to provide rendered graphics according to the compositing flow. Example methods may include receiving, via a network, application control instructions from a client device; sending to the intermediary computing device, via the network, session information identifying the client device; generating the compositing flow, wherein the compositing flow may comprise model identifiers and model rendering information as a real-time graphics application output resulting from processing, by the real-time graphics application, an input comprising application control instructions from the client device, wherein the compositing flow optionally does not include one or more models identified by the model identifiers, and wherein the model rendering information comprises at least model position information; and sending, via the network, the compositing flow to the intermediary computing device. Example methods may furthermore include sending models to the intermediary computing device using any of several model delivery approaches described herein.

Some example methods may comprise methods for managing intermediary graphics rendering in a local network. Example methods may include collecting, by a graphics rendering manager in a local network, graphics processing capability information of computing devices in the local network; receiving, by the graphics rendering manager, a request to initiate intermediary graphics rendering for a client in the local network; selecting, by the graphics rendering manager, based on collected graphics processing capability information, a computing device from among the one or more computing devices in the local network to serve as an intermediary computing device to conduct intermediary graphics rendering for the client; and directing, by the graphics rendering manager, a compositing flow comprising model identifiers and model rendering information to the selected computing device to enable the selected computing device to render graphics for delivery to the client.

Some example methods may comprise methods for determining, by a system controller, an intermediary computing device to conduct intermediary graphics rendering for a client, wherein the intermediary computing device is connected to a local network comprising the client. Example methods may include receiving, by the system controller, session information identifying the client and identifying a graphics rendering manager device connected to the local network; sending, by the system controller, to the graphics rendering manager device, a request to initiate intermediary graphics rendering in the local network for the client; receiving, by the system controller, an identification of a selected computing device in the local network, wherein the selected computing device is selected to serve as an intermediary computing device to conduct intermediary graphics rendering for the client; and directing, by the system controller, a compositing flow comprising model identifiers and model rendering information to the selected computing device to enable the selected computing device to render graphics for delivery to the client.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include an intermediary computing device comprising a processor, a memory, and a graphics rendering intermediary configured to carry out the intermediary methods described herein; a graphics rendering manager device comprising a processor, a memory, and a graphics rendering manager configured to carry out intermediary graphics rendering management methods described herein; and a server computing device comprising a processor, a memory, a real-time graphics application configured to carry out the server methods described herein, and/or a system controller configured to carry out the system controller methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
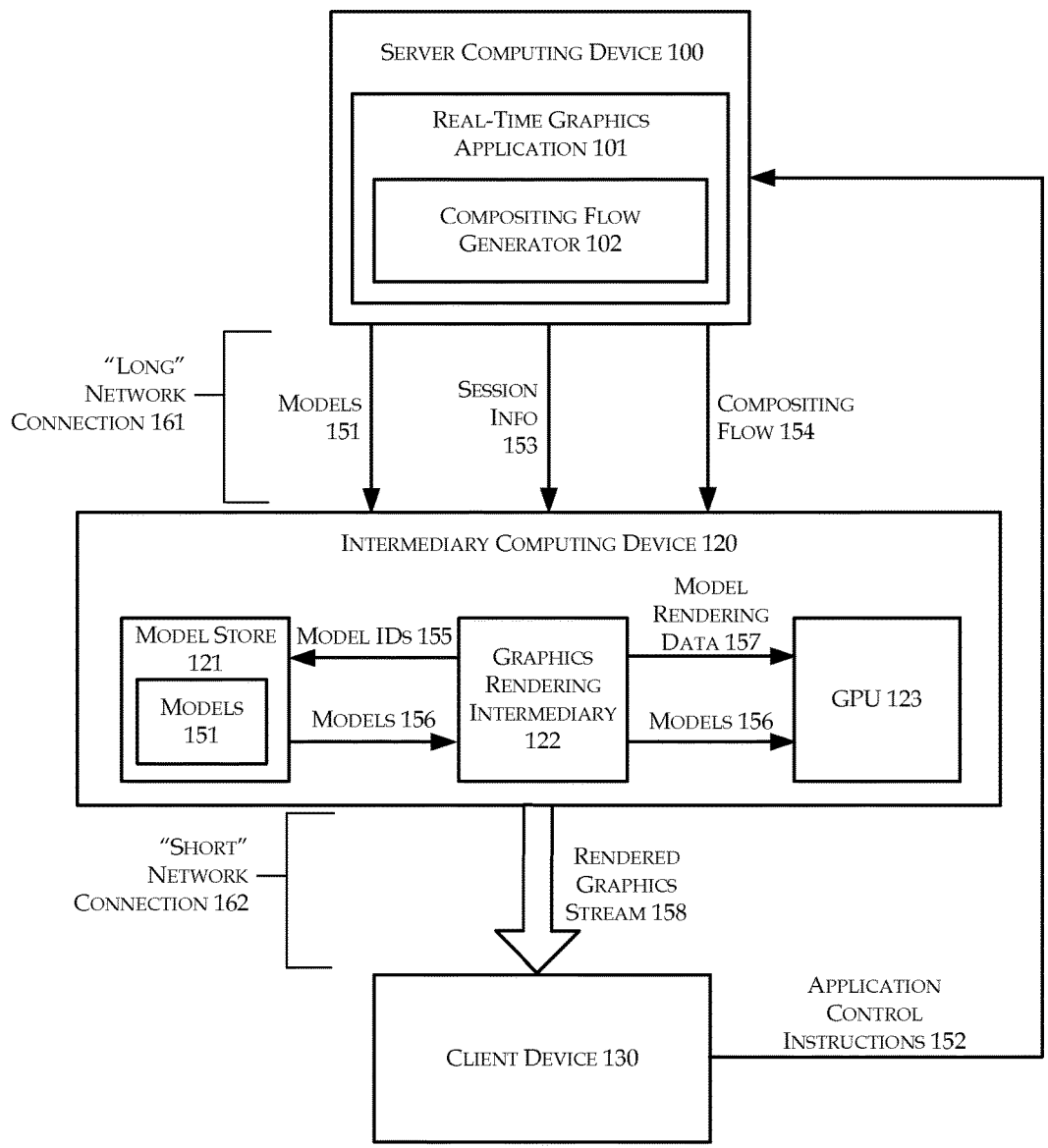
FIG. 1 is a diagram illustrating example server, intermediary, and client devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to rendering graphics using an intermediary. In some examples, an intermediary computing device may store graphics models in a model store. A server computing device may generate and send a compositing flow to the intermediary computing device. The compositing flow may comprise model identifiers and model rendering information. The intermediary computing device may retrieve models identified in the compositing flow from the model store, and provide the identified models and model rendering information to a GPU for rendering. The GPU may render graphics for delivery via a network to a client device.

In some examples, one or more devices in a local network may be equipped to serve as real-time graphics rendering intermediary computing devices for clients in the local network. A graphics rendering manager for the local network may collect graphics processing capability information of the devices in a local network, and may select computing device(s) in the local network to serve as intermediary computing device(s). The graphics rendering manager may interact with a system controller at a server or datacenter to direct compositing flow(s) to the selected computing device(s), responsive to system controller requests to initiate intermediary graphics rendering for clients in the local network.

A video game application is used herein as an example real-time graphics application which may be equipped for intermediary graphics rendition according to this disclosure. For example, servers at a data center may host a multiplayer online video game. The video game may use video game models such as video game objects, video game characters, and video game scenery elements. Example video game objects include books, vehicles, treasure chests, clothing, weapons, etc. Example video game characters include characters representing one or more players of the video game, monsters, opponents, assistants, etc. Example video game scenery elements include rocks, trees, buildings, etc. In a multiplayer online video game, model identifiers and model rendering information in compositing flows may be influenced by the actions of the multiple players of video game. Persons of skill in the art will appreciate that the technologies described herein may be applied in applications other than video games, namely, in any applications that deliver real-time rendered graphics to one or more client devices.

In an example use of the intermediary graphics rendition technologies described herein, a user desiring to play a video game may use a client device, such as a Personal Computer (PC), mobile phone, tablet, video gaming console, television, or other computing device, to connect, via a network such as the Internet, to a video game application hosted at one or more servers in a data center. The video game application and the client device may initially exchange network address, identity and/or credential information to establish a communication session.

Once the client device is connected to the video game application, the user may control an input device such as a keyboard, mouse, joystick, touch screen, or other device to interact with the video game application. User inputs to interact with an application are referred to herein as application control instructions. The client device may transmit received application control instructions across the network, to the video game application. The video game application may receive and process the application control instructions.

The video game application hosted at the data center may be adapted to process application control instruction inputs received from the client device, and to generate compositing flow outputs. The compositing flow may comprise model identifiers and model rendering information. The video game application may send the compositing flow to an intermediary computing device, to thereby employ the intermediary computing device to render video game graphics responsive to the application control instructions, and to deliver rendered graphics to the client device. The client device may receive and display the rendered graphics. The user may continue to interact with the video game, generating additional application control instructions which may be similarly sent from the client device to the video game application at the datacenter. The video game application may continue to receive and process application control instructions; and the video game application may continue to provide a compositing flow to the intermediary computing device, to employ the intermediary computing device to render video game graphics and deliver rendered graphics to the client device.

FIG. 1 is a diagram illustrating example server, intermediary, and client devices, arranged in accordance with at least some embodiments of the present disclosure. As depicted, FIG. 1 includes a server computing device 100, an intermediary computing device 120, and a client device 130. Server computing device 100 comprises a real-time graphics application 101, and real-time graphics application 101 comprises a compositing flow generator 102. Intermediary computing device 120 comprises a model store 121, a graphics rendering intermediary 122, and a GPU 123.

Server computing device 100, intermediary computing device 120, and client device 130 may be coupled via a network comprising wired and/or wireless network connections, such as the Internet. In some embodiments, server computing device 100 may be coupled with intermediary computing device 120 via a "long" network connection 161, and intermediary computing device 120 may be coupled with client device 130 via a "short" network connection 162. "Long" and "short" network connections 161 and 162 may comprise portions of a larger network, such as the Internet, wherein the "long" network connection 161 may be longer than "short" network connection 162 in the sense of having longer network packet travel times between endpoints and/or having higher transmission costs, which may, but need not result from longer physical distance.

In some embodiments, "long" network connection 161 may for example include Tier 1 networks, which may be run at high load factors and may be paid (by money or peering credits) based on Terabytes (TB) delivered. "Long" network connection 161 may also include more network hops and/or portions of the larger network subject to higher loads than "short" network connection 162. For example, when server computing device 100 is a server in any given datacenter, and a CDN, Metro Area Network (MAN), or other network includes servers that may be adapted to serve as intermediary computing devices, then intermediary computing device 120 may comprise a CDN or MAN server that may be selected to render graphics for client device 130. Server computing device 100 may select intermediary computing device 120, at least in part, for its relatively short network connection to client device 130. Meanwhile, server computing device 100 may be coupled with client device 130 via any combination of network connections 161 and 162, portions thereof, and/or via additional network segments not shown in FIG. 1.

In some embodiments, "short" network connection 162 may comprise a LAN connection between devices in a same local network, e.g., intermediary computing device 120 and client device 130 may be in a same local network, such as a wired or wireless home or office network. Server computing device 100 may be outside the local network, such as in a remote datacenter. Devices in the local network may communicate with server computing device 100 via "long" network connection 161. FIG. 8-FIG. 12 describe further aspects relating to embodiments wherein intermediary computing device 120 and client device 130 are in a same local network.

In some embodiments, real-time graphics application 101 may be adapted to send models 151 to intermediary computing device 120 via "long" network connection 161. Real-time graphics application 101 may be adapted to optionally also send models 151 to any other intermediary computing devices which real-time graphics application 101 may employ for graphics rendering and delivery. Each of the models 151 sent to intermediary computing device 120 may be identified by a model identifier (ID), e.g., by a model ID comprising a unique string of letters, numbers, and/or symbols which may be used to uniquely identify each model. Intermediary computing device 120 may be adapted to receive models 151 and to store models 151 identified by model IDs in model store 121.

Models 151 may comprise digital data representing graphical elements employed by real-time graphics application 101. For example, in the context of a video game application, models 151 may comprise three dimensional (3D) digital models of objects, characters, and/or scenery elements encountered by players of the video game. In some embodiments, models 151 may include, or may be associated with, audio as well as visual properties, and/or other properties such as tactile feedback properties, e.g., for controller vibrations or other tactile feedback which may be applied at client device 130 in connection with player encounters with a model.

Real-time graphics application 101 may be adapted to establish a communication session with client device 130, e.g., in response to a connection request from client device 130. During the communication session, client device 130 may transmit application control instructions 152 across a network, such as the Internet, to real-time graphics application 101. In some embodiments, real-time graphics application 101 may also establish communication sessions with multiple other client devices, and may receive application control instructions from the multiple other client devices, e.g., client devices operated by the multiple players of a multiplayer online video game.

Real-time graphics application 101 may be adapted to receive and process application control instructions 152, optionally along with application control instructions received from multiple other client devices. Processing application control instructions 152 may comprise, inter alia, using compositing flow generator 102 to generate compositing flow 154. Real-time graphics application 101 may be adapted to send compositing flow 154 to intermediary computing device 120 for graphics rendering and delivery of rendered graphics stream 158 to client device 130. In some embodiments, real-time graphics application 101 may optionally be configured to send compositing flow 154 to multiple different intermediary computing devices for graphics rendering and delivery of identical rendered graphics streams to each of multiple client devices. In some embodiments, real-time graphics application 101 may optionally be configured to generate different compositing flows for each of multiple client devices, and to deliver the different compositing flows to multiple different intermediary computing devices. The multiple different intermediary computing devices may in turn render and deliver different rendered graphics streams for each of the multiple client devices. Compositing flow 154 may comprise model IDs and model rendering data as a real-time graphics application 101 output resulting from processing, by real-time graphics application 101, an input comprising application control instructions 152. Compositing flow 154 may optionally not include some or all models identified by model IDs included in compositing flow 154.

Compositing flow generator 102 may be arranged to generate compositing flow 154 as a substitute for, or as a lightweight version of, a rendered graphics stream. Real-time graphics application 101 may or may not generate a rendered graphics stream locally at server computing device 100 in addition to generating compositing flow 154 for delivery to intermediary computing device 120.

In embodiments adapted to render graphics via a local GPU at server computing device 100, real-time graphics application 101 may be adapted to send to the local GPU shape primitives represented using vertexes in 3D space and properties such as colors and textures at those vertexes. The shape primitives may be sent to the local GPU without compositing information such as model position information, model orientation information, viewpoint information, or light source information. Instead, the vertex locations may be in an object coordinate system that represents a model. Real-time graphics application 101 may apply a compositing operation in which instructions are sent to the local GPU for, inter alia, the position, orientation, viewpoint and/or light source of each model. Compositing instructions may be used, e.g., to position, orient, translate, and rotate each object coordinate system, and/or apply lighting/shading to the models. Positioning models may comprise both "environmental" positioning of models in a scene, and "internal" positioning of models by adjusting portions of a model relative to the model as a whole. For example, "internal" positioning may comprise bending and straightening the legs of models to crouch or walk, raising and lowering the arms of models, turning model head angles, etc. A view of the various models composed according to the compositing operation may comprise a rendered 2D view of a 3D scene.

Compositing complexities may arise from the fact that models may be very large and rendering a typical scene may include providing models and information multiple times per frame, which is one reason why graphics cards generally use high bandwidth Peripheral Component Interconnect (PCI) communications. Scene compositing techniques may come in three varieties: sort-first, sort middle, and sort-last. In embodiments adapted to provide multiple views of unfolding scenes, e.g., in the case of multiplayer video games wherein each player may view a scene from a different viewpoint, real-time graphics application 101 may compose each scene by loading appropriate models and positioning the models, and orienting the models, lighting the models, etc. Real-time graphics application 101 may then render multiple different views of each scene, e.g., views from the viewpoints of the multiple players. It will be appreciated with the benefit of this disclosure that such approaches may also be used by some embodiments to generate multiple compositing flows for delivery to multiple intermediary computing devices.

In some embodiments, real-time graphics application 101 may adapted to generate compositing flow 154 as a substitute for, or in addition to, rendering graphics via a local GPU as described above. It may be observed that if real-time graphics application 101 interactions with a local GPU at server computing device 100 did not require model delivery, compositing operations may be limited to providing instructions comprising model IDs and rendering information such as model orientations and placement, viewpoints, textures, and light source information. In some cases, certain rendering information may also be limited, e.g., by omitting light source, positioning, orientation, or other rendering information when such rendering information remains unchanged from scene to scene. A hypothetical very large memory GPU with models preloaded, may use, e.g., a few kilobytes (KB) per second of compositing updates instead of, e.g., the 8

Gigabytes (GB) per second of 32 lane PCI-express that is currently used for graphics rendering including model delivery.

In some embodiments, compositing flow generator 102 may be arranged to generate compositing flow 154 by either calculating or extracting compositing operation instructions substantially similar to the compositing operation instructions that may be sent to the local GPU at server computing device 100. Compositing flow generator 102 may be adapted to include the compositing operation instructions in compositing flow 154. In some embodiments, compositing flow generator 102 may be adapted to modify compositing operation instructions, e.g., by inserting or modifying model ID numbers. Real-time graphics application 101 may or may not also generate a rendered graphics stream locally at server computing device 100 as a byproduct of generating compositing flow 154, or for other reasons.

Intermediary computing devices such as CDN servers and high-performance home or office computing devices may comprise large memory model stores such as model store 121, and intermediary computing device 120 may leverage model store 121 to effectively implement, at intermediary computing device 120, the hypothetical very large memory graphics card described above for use by real-time graphics application 101, at least partially allowing the corresponding reduction in network traffic by separating delivery of models 151 from delivery of compositing flow 154.

Real-time graphics application 101 may be adapted to employ intermediary computing device 120 to render graphics and deliver rendered graphics to client device 130 by sending, via "long" network connection 161, session information 153 and compositing flow 154 to intermediary computing device 120. Real-time graphics application 101 may optionally send compositing flow 154 to intermediary computing device 120 using high priority channels. Real-time graphics application 101 may be adapted to employ intermediary computing device 120 and/or other intermediary computing devices to render graphics and deliver rendered graphics to multiple other client devices.

Intermediary computing device 120 may be adapted with graphics rendering intermediary 122, wherein graphics rendering intermediary 122 may be adapted to manage receiving models 151 at intermediary computing device 120, storing models 151 in model store 121, receiving session information 153 and compositing flow 154 from server computing device 100, graphics rendering by GPU 123, and delivery of rendered graphics stream 158 to client device 130, on behalf of real-time graphics application 101. In some embodiments, intermediary computing device 120 may also be adapted to render graphics and supply rendered graphics streams to multiple other client devices, e.g., by loading multiple instances of graphics rendering intermediary 122 to serve the multiple client devices. Intermediary computing device 120 may thereby be adapted to simultaneously generate multiple different rendered graphics streams from multiple different received compositing flows. Intermediary computing device 120 may simultaneously supply each of the different rendered graphics streams to a different client device, where the client devices may be identified in received session information applicable to each received compositing flow.

Graphics rendering intermediary 122 may be adapted to receive and store models 151 according to one or more different model delivery embodiments. The one or more different model delivery embodiments may also be implemented at server computing device 100. In some model delivery embodiments, real-time graphics application 101 may be adapted to send models 151 to intermediary computing device 120 prior to communication sessions with client devices. Graphics rendering intermediary 122 may be correspondingly adapted to receive and store models 151 for use in graphics rendering operations in connection with future potential communication sessions with client devices.

In some model delivery embodiments, real-time graphics application 101 may be adapted to send models 151 to intermediary computing device 120 during a communication session with client device 130. Graphics rendering intermediary 122 may correspondingly be adapted to receive and store models 151 for use in graphics rendering operations in connection with the ongoing communication session with client device 130. Graphics rendering intermediary 122 may also optionally be adapted to store models 151 for use in graphics rendering operations in connection with future potential communication sessions with client devices.

In some model delivery embodiments, real-time graphics application 101 may be adapted to send models 151 to intermediary computing device 120 in hybrid fashion, e.g., by sending some of models 151 prior to communication sessions with client devices, and sending some of models 151 during the communication session with client device 130. Graphics rendering intermediary 122 may correspondingly be adapted to receive and store both the initially and subsequently received models 151 for use in graphics rendering operations. Graphics rendering intermediary 122 may use the initially and subsequently received models 151 in connection with the ongoing communication session with client device 130. Graphics rendering intermediary 122 may store the initially and subsequently received models 151 for use in graphics rendering operations in connection with future potential communication sessions with client devices.

In response to receiving session information 153 from server computing device 100, graphics rendering intermediary 122 may be adapted to establish a communication session with client device 130. In some embodiments, session information 153 may identify client device 130 to intermediary computing device 120. In some embodiments, session information 153 may include additional session information, such as a session ID for the communication session between real-time graphics application 101 and client device 130, to allow intermediary computing device 120 to send rendered graphics to client device 130 in a manner that integrates with the session between client device 130 and real-time graphics application 101. In the communication session with client device 130, intermediary computing device 120 may send rendered graphics stream 158 to client device 130, for display at client device 130 in connection with the session between server computing device 100 and client device 130.

In an example operation according to FIG. 1, compositing flow 154 may comprise model IDs 155, which may identify models 156 within a larger set of models 151 in model store 121. Compositing flow 154 may also comprise model rendering data 157 for models 156. Model rendering data 157 may include, e.g., model position information (including "environmental" and/or "internal" position information), model orientation information, viewpoint information, texture information, light source information, and/or any other information specifying how models 156 are to be rendered, e.g., by positioning models 156, orienting models 156, viewing models 156 from one or more viewpoints, applying a texture to modes 156, and/or lighting (and shading) models 156 according to light source information. Model rendering data 157 may optionally be accompanied by audio, tactile, or other data specifying additional outputs for playback in connection with displaying a rendered model.

In response to receiving compositing flow 154, graphics rendering intermediary 122 may be adapted to retrieve models 156 identified in compositing flow 154. For example, graphics rendering intermediary 122 may query model store 121 with model IDs 155, and model store 121 may return corresponding models 156. Graphics rendering intermediary 122 may be adapted to optionally combine or sequence models 156 and rendering data 157 for GPU 123. Graphics rendering intermediary 122 may be adapted to provide models 156 and rendering data 157, optionally as a combined or sequenced stream, to GPU 123 for rendering, thereby causing GPU 123 to render graphics for delivery to client device 130. Models 156 and rendering data 157 may be combined or sequenced according to, e.g., any industry standard graphics format, such as for example graphics formats used by the various Open Graphics Library (OpenGL) standards.

In some embodiments, a same GPU, such as GPU 123, may be used to simultaneously provide rendered graphics to multiple clients according to multiple different compositing flows. For example, GPU 123 may comprise a virtualized or shared GPU, for example using VGX virtualization technologies made by NVIDIA®. Such arrangements allow real-time graphics application 101 and/or multiple different real-time graphics applications served by different model stores at intermediary computing device 120, to effect delivery of multiple different rendered graphics streams to different client devices while sharing GPU 123 at intermediary computing device 120 as appropriate to the particular demands of each rendered graphics stream.

In some embodiments, GPU 123 may comprise a datacenter targeted GPU graphics card. Current graphics cards include, for example, NVIDIA KEPLER® and AMD SKY® series graphics cards. The AMD SKY 900 currently has 3,584 stream processors. Thus if 480 stream processors are used for generating HD rendered video graphics streams for each client device, an average of 22 end users/client devices could be served by a single intermediary computing device 120 comprising three AMD SKY 900 cards. Applying a roughly estimated gain of 2× for virtualization load optimization would serve 44 end users/client devices, again for a single intermediary computing device 120. A datacenter comprising intermediary computing device 120 may of course include additional intermediary computing devices as necessary to meet demand.

Rendered graphics stream 158 may comprise rendered video graphics from GPU 123, including renderings of models 156 from the model store 121 as identified by model IDs 155 in compositing flow 154, the models 156 positioned and otherwise rendered according to model position information and/or other data in model rendering data 157 from compositing flow 154. Graphics rendering intermediary 122 may be adapted to deliver rendered graphics stream 158 to client device 130, or to otherwise cause rendered graphics stream 158 to be delivered from GPU 123 to client device 130, via "short" network connection 162.

In some embodiments, graphics rendering intermediary 122 may operate continuously or substantially continuously as an ongoing compositing flow 154 is received. In other words, compositing flow 154 may comprise a continuous or substantially continuous flow of different model IDs and model rendering data, which may continue throughout a communication session between server computing device 100 and client device 130. Graphics rendering intermediary 122 may continuously or substantially continuously receive the different model IDs and model rendering data, retrieve identified models from model store 121, supply models and model rendering data to GPU 123, and deliver rendered graphics stream 158 to client device 130 as identified in session information 153. When the session between server computing device 100 and client device 130 is terminated, server computing device 100 may optionally send a termination notification (not shown in FIG. 1) to intermediary computing device 120, or server computing device 100 may discontinue compositing flow 154, and intermediary computing device 120 may discontinue graphics rendering on behalf of server computing device 100 in response to the termination notification or discontinuation of compositing flow 154.

It will be appreciated that while in some embodiments, intermediary computing device 120 may receive models 151 from server computing device 100 via network connection 161, other embodiments may comprise sending models 151 to intermediary computing device 120 by a model delivery server other than server computing device 100. Furthermore, models 151 may be provided to intermediary computing device 120 by shipping a Digital Versatile Disk (DVD) or other storage medium to operators of intermediary computing device 120, who may then transfer models 151 from such storage media to model store 121.

In model delivery embodiments wherein real-time graphics application 101 is adapted to send models 151 to intermediary computing device 120 prior to communication sessions with client devices, and graphics rendering intermediary 122 is adapted to receive and store models 151 for use in graphics rendering operations in connection with future potential communication sessions with client devices, real-time graphics application 101 may send models 151 in any number of model packages and/or model updates. The model packages and model updates may identify real-time graphics application 101 so that intermediary computing device 120 may store received models in an appropriate model store 121. In some embodiments, intermediary computing device 120 may include, or intermediary computing device 120 may have access to, multiple model stores for use in connection with multiple different real-time graphics applications.

In model delivery embodiments wherein real-time graphics application 101 is adapted to send models 151 to intermediary computing device 120 during a communication session with client device 130, and graphics rendering intermediary 122 is adapted to receive and store models 151 for use in graphics rendering operations in connection with the ongoing communication session with client device 130, real-time graphics application 101 may include models 151 in compositing flow 154. For example, real-time graphics application 101 may initially include, in compositing flow 154, models referenced by model IDs such as model IDs 155 which are referenced in compositing flow 154. As compositing flow 154 continues, some of the referenced models may be new, i.e., may have not been previously included in compositing flow 154, while other referenced models may have been previously included in compositing flow 154. Real-time graphics application 101 may be adapted to determine which models identified by the model IDs in compositing flow 154 were previously sent to the intermediary computing device 120. Real-time graphics application 101 may include models not previously sent to intermediary computing device 120 in compositing flow 154, while not including models previously sent to intermediary computing device 120 in compositing flow 154. Thus for example, in some scenarios, as compositing flow 154 continues, real-time graphics application 101 may include fewer models in compositing flow 154.

Meanwhile, in response to receiving models in compositing flow 154, e.g., models not previously stored in model store 121, intermediary computing device 120 may be adapted to extract the models from compositing flow 154 and store the extracted models in model store 121. Storing extracted models in model store 121 may be done simultaneously with providing models in compositing flow 154 along with model rendering data to GPU 123 for graphics rendering and delivery of rendered graphics stream 158 to client device 130.

Example real-time graphics applications may include, e.g., applications such as those accessible via the GAIKAI®, ONLIVE®, and cloud gaming networks, which may be modified to incorporate the technologies described herein. An advantage of real-time graphics applications in general includes the ability to deliver rendered graphics streams to different client devices in which memory and processing capabilities may be variable. Highly capable desktop computers or gaming consoles with onboard GPUs may be able to render graphics locally, however, lower capability tablets, televisions, or smart phones may not have sufficient onboard graphics processing to render graphics locally. To serve all client devices, regardless of device capabilities, it may be advantageous to deliver full-fledged video via the network, rather than rely on local client device capabilities. However, this disclosure appreciates that delivering full-fledged video over "long" network connection 161 is more costly and lower performance than delivering full-fledged video over "short" network connection 162.

This disclosure therefore provides, inter alia, an approach for delivering relatively lightweight compositing flows over "long" network connection 161, while delivering full-fledged video over "short" network connection 162. Benefits of such an approach include removal of large bandwidth video traffic from long haul layers of the network, reducing the network costs for delivering video to client devices. As a result, users at client devices may experience more responsive real-time graphics applications, while continuing to receive high quality video. Client devices may also conserve power by not rendering graphics within the client device, thereby improving battery life, e.g., for mobile devices. Because delivered video graphics may not be subject to long haul congestion, delivered video graphics may also be of higher quality and stability. Real-time graphics applications providers, meanwhile, may pay less to provide such streamed video. Intermediary computing device operators may have a meaningful service to offer to real-time graphics applications, driving some payments into CDNs or other operators of intermediary computing devices, and in turn the cable and other last mile operators who work with CDNs. Furthermore, hardware costs associated with GPUs may also be reduced by sharing GPU resources of intermediary computing devices across multiple real-time graphics applications.

Figure 2:
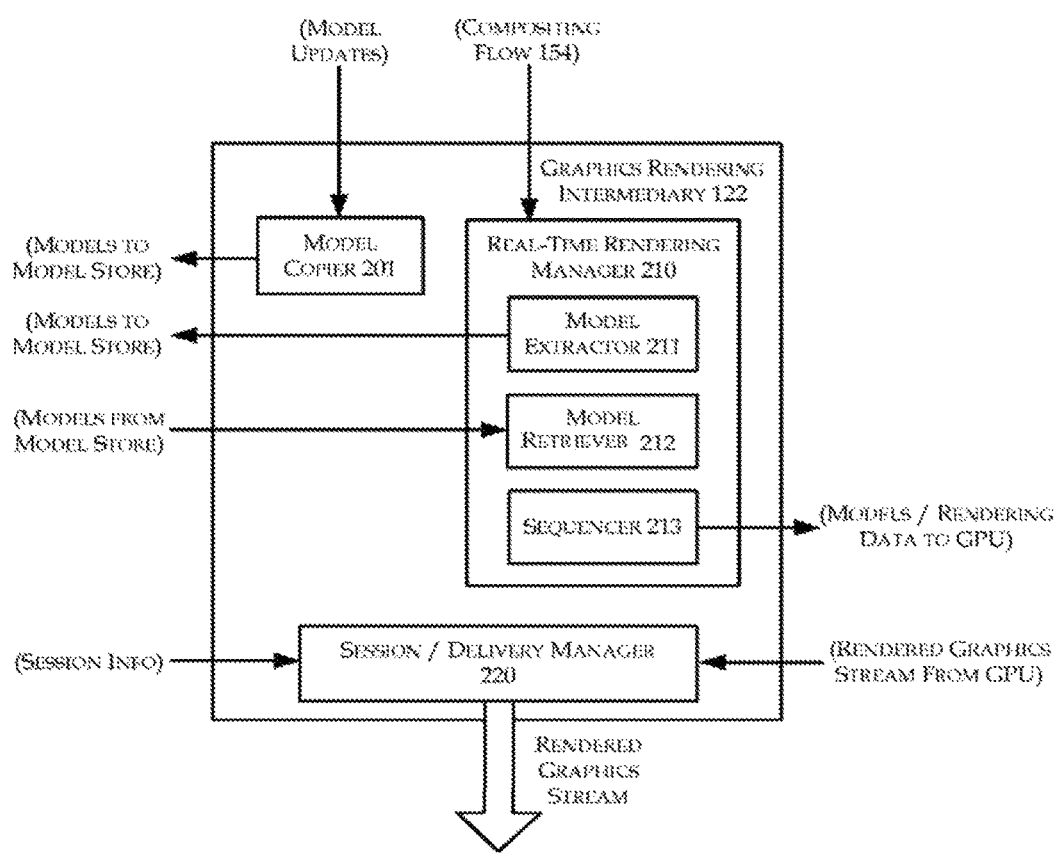
FIG. 2 is a diagram illustrating an example graphics rendering intermediary as may be configured at an intermediary computing device.

FIG. 2 is a diagram illustrating an example graphics rendering intermediary as may be configured at an intermediary computing device, arranged in accordance with at least some embodiments of the present disclosure. Example graphics rendering intermediary 122 comprises a model copier 201, a real-time rendering manager 210, and a session/delivery manager 220. Real-time rendering manager 210 comprises a model extractor 211, a model retriever 212, and a sequencer 213.

In FIG. 2, graphics rendering intermediary 122 may be adapted to receive models in multiple different model delivery modes. Model copier 201 may be adapted to receive and store model updates in a model store, for use in graphics rendering operations in connection with future potential communication sessions with client devices. Model extractor 211 may be adapted to extract models from compositing flow 154, and to store extracted models in the model store for use in an ongoing communication session with a client device, as well as optionally for use in graphics rendering operations in connection with future potential communication sessions with client devices. Graphics rendering intermediary 122 may be adapted receive models via either or both of model copier 201 and/or model extractor 211.

Real-time rendering manager 210 may be adapted to receive compositing flow 154; employ model extractor 211 to extract any models included in compositing flow 154 and store extracted models in the model store; employ model retriever 212 to retrieve, from the model store, models identified by model IDs in compositing flow 154; and employ sequencer 213 to sequence a stream of models and rendering data, the stream comprising rendering information from compositing flow 154 and models, wherein the models in the stream may be extracted from compositing flow 154 and/or retrieved from the model store. Real-time rendering manager 210 and/or sequencer 213 may be adapted to deliver the sequenced stream of models and rendering data to the GPU.

Session/delivery manager 220 may be adapted to receive session info identifying a client device and/or session ID for a session between a server computing device a client device; establish communications with the client device in the context of the identified session; receive a rendered graphics stream from the GPU; and send the rendered graphics stream to the client device.

Figure 3:
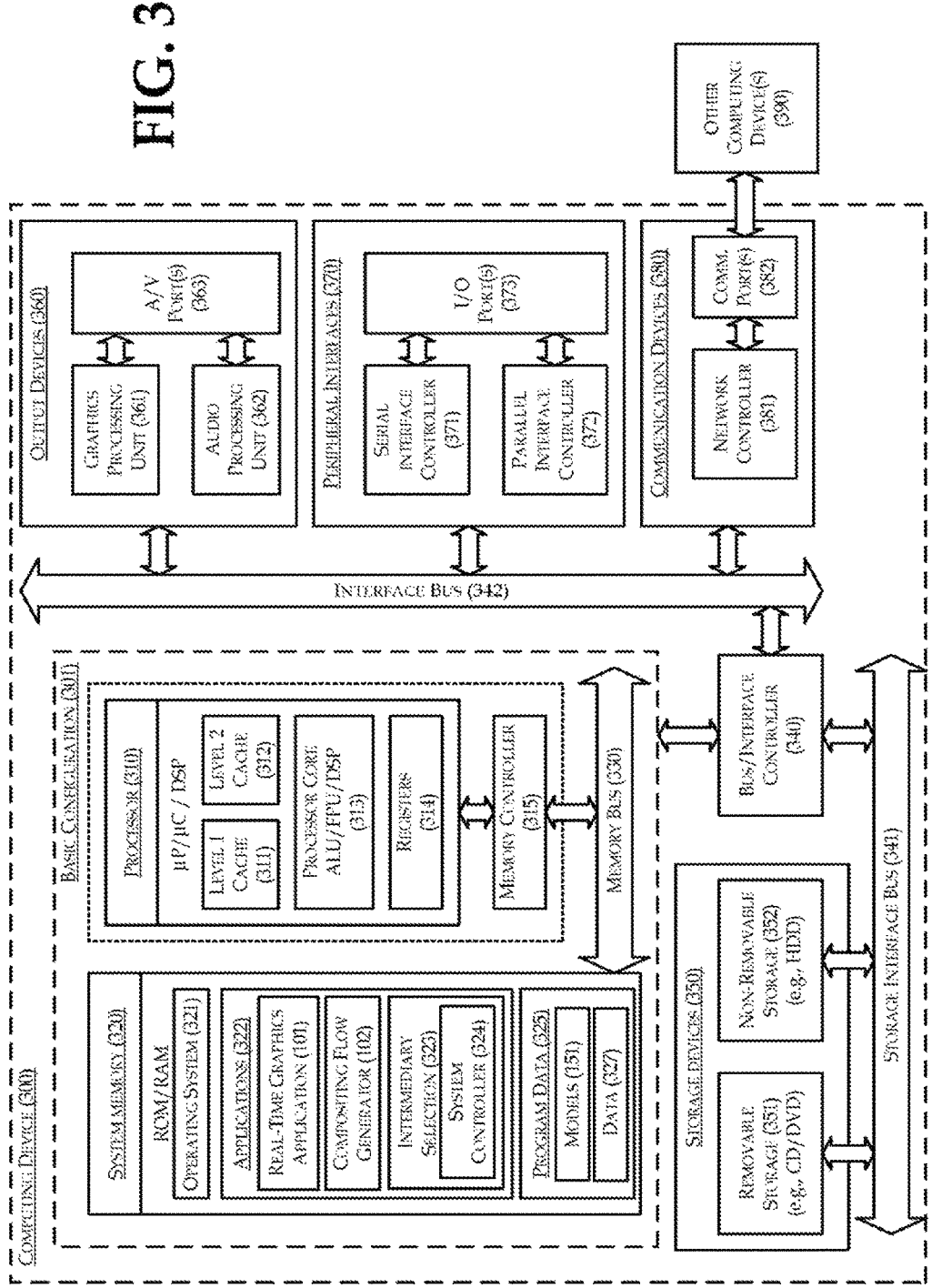
FIG. 3 is a block diagram of a computing device as one example of a server computing device providing a real-time graphics rendering application.

FIG. 3 is a block diagram of a computing device as one example of a server computing device providing a real-time graphics rendering application, arranged in accordance with at least some embodiments of the present disclosure. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 typically includes an operating system 321, one or more applications 322, and program data 325. In some embodiments, operating system 321 may comprise a virtual machine that is managed by a Virtual Machine Manager (VMM).

Applications 322 may include, for example, real-time graphics application 101, compositing flow generator 102, and/or intermediary selection module(s) 323. Real-time graphics application 101 and compositing flow generator 102 are introduced above in connection with FIG. 1. In some embodiments, compositing flow generator 102 may be deployed within operating system 321. Compositing flow generator 102 may for example be available as an operating system service available to multiple different real-time graphics applications. Intermediary selection module(s) 323 may be adapted to select an appropriate intermediary computing device for each client device that interacts with real-time graphics application 101. Intermediary selection module(s) 323 may generally use network locations of client devices and available intermediary computing devices to make intermediary computing device selections. For example, intermediary selection module(s) 323 may be adapted to select an intermediary computing device with a shortest network connection to a client device. In some embodiments, intermediary selection module(s) 323 may include, inter alia, a system controller 324, adapted to interact with graphics rendering managers in local networks, as described herein with reference to FIG. 8-FIG. 12.

Program data 325 may include models 151 and data 327 that may be used by applications 322. Data 327 may include, e.g., lists of models that have previously been delivered to each intermediary computing device. It will be appreciated that real-time graphics applications may use any of a wide variety of application-specific program data which may be included in program data 325.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 311, level 2 cache 312, system memory 320, removable storage 351, and non-removable storage devices 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 300. Any such computer storage media may be part of device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 may include a serial interface controller 371 or a parallel interface controller 372, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 373. Other conventional I/O devices may be connected as well such as a mouse, keyboard, and so forth. An example communications device 380 includes a network controller 381, which may be arranged to facilitate communications with one or more other computing devices 390 over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may be implemented as a server computing device in a data center. In some embodiments, the data center may comprise an "open" data center that provides computational resources to multiple different customers, including, e.g., an owner/operator of real-time graphics application 101. In some embodiments, the data center may comprise a "closed" data center which may be used exclusively by the owner/operator of real-time graphics application 101, e.g., to run real-time graphics application 101 and optionally other real-time graphics applications also owned or controlled by the same owner/operator. In some embodiments, computing device 300 may be implemented as a server computing device at a data center hosting a multiplayer online video game enabled by real-time graphics application 101, wherein models 151 may comprise video game models, and wherein model identifiers and model rendering information in compositing flows generated by compositing flow generator 102 may be influenced by application control instructions from multiple players of the multiplayer online video game.

Figure 4:
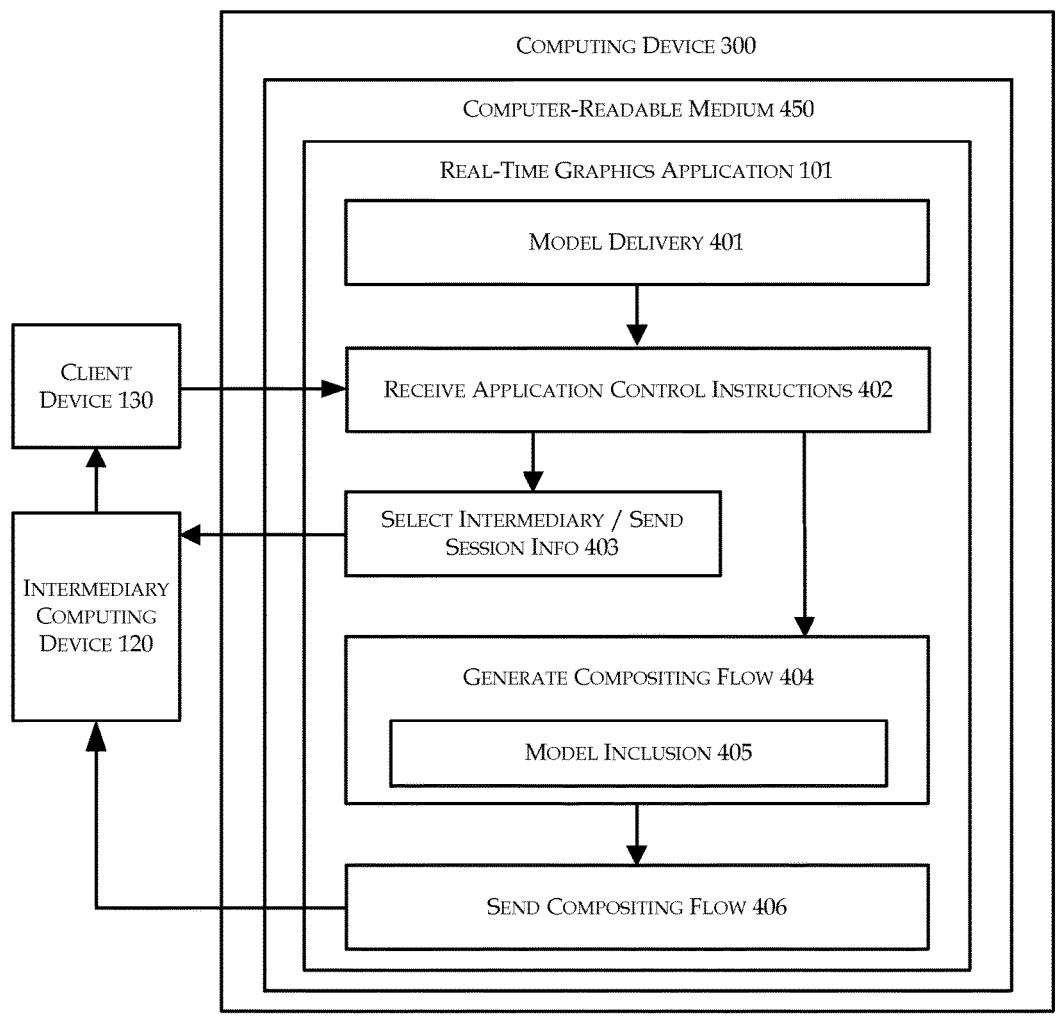
FIG. 4 is a flow diagram of example methods for providing, by a server computing device, a compositing flow to an intermediary computing device.

FIG. 4 is a flow diagram of example methods for providing, by a server computing device, a compositing flow to an intermediary computing device, arranged in accordance with at least some embodiments of the present disclosure. The example flow diagram may include one or more operations/modules as illustrated by blocks 401-406, which represent operations as may be performed in a method by real-time graphics application 101, functional modules in a computing device 300, and/or instructions as may be recorded on a computer readable medium 450. The illustrated blocks 401-406 may interact with intermediary computing device 120 and client device 130 as shown.

In FIG. 4, blocks 401-406 are illustrated as including blocks being performed sequentially, e.g., with block 401 first and block 406 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 300, arranged as a server computing device such as server computing device 100 in FIG. 1, may provide, to intermediary computing device 120, a compositing flow according to application control instructions received from client device 130, wherein intermediary computing device 120 is adapted to provide rendered graphics according to the compositing flow to client device 130. In FIG. 4, a "Model Delivery" block 401 precedes a loop comprising a "Receive Application Control Instructions" block 402, a "Generate Compositing Flow" block 404 and a "Model Inclusion" block 405, and a "Send Compositing Flow" block 406. To complete the loop, block 406 sends a compositing flow to intermediary computing device 120, intermediary computing device 120 sends a rendered graphics stream to client device 130, and client device 130 sends additional application control instructions to "Receive Application Control Instructions" block 402. In a first instance of the loop comprising blocks 402, 404/405, and 406, operations pursuant to a "Select Intermediary/Send Session Information" block 403 may additionally be performed. Block 403 need not necessarily be performed in subsequent instances of the loop comprising blocks 402, 404/405, and 406.

At "Model Delivery" block 401, computing device 300 may send, via a network, one or more models to intermediary computing device 120. In embodiments wherein computing device 300 is adapted with block 401, computing device 300 may send models by any appropriate method. For example, computing device 300 may send models as a model package comprising substantially all models for use with real-time graphics application 101; computing device 300 may send an initial model package followed by model update packages; computing device 300 may send models at night or during periods of low network demand on a long network connection such as 161; and computing device 300 may optionally employ any available technologies for transferring large model files to a plurality of intermediary computing devices. In some embodiments, computing device 300 may select, at block 401, a set of models for delivery at block 401. The selected set of models may be a subset of the models used by real-time graphics application 101. Model selection may optionally account for one or more of model popularity, model size, expected time until model update, statistical probability of use of a model, previous use of a model by a particular user or user demographic, and/or any number of other considerations as may be appreciated with the benefit of this disclosure.

Block 401 may be omitted in some embodiments. For example, models may be provided to intermediary computing device 120 by a separate model server, other than server computing device 300; block 401 may be accomplished by physically mailing a DVD or other computer readable memory to operators of intermediary computing device 120; or computing device 300 and real-time graphics application 101 may rely on block 405 for model delivery. Block 401 may be followed by block 402, wherein block 402 may occur at any time subsequent to block 401, in connection with an initiated session between real-time graphics application 101 and client device 130.

At "Receive Application Control Instructions" block 402, computing device 300 may receive, via the network, application control instructions from client device 130. In embodiments wherein real-time graphics application 101 supports interactions of multiple users or players, block 402 may comprise receiving application control instructions from client device 130 as well as from multiple other devices corresponding to other users or players of the real-time graphics application 101.

Real-time graphics application 101 may generally perform any operations in connection with initiating a session with client device 130, and thereafter providing application services to client device 130. Specific application services may depend on the purpose for which real-time graphics application 101 is designed. Example embodiments described herein include but are not limited to video game services. Application control instructions for a video game application may comprise, e.g., player movement and other player action commands. Block 402 may be followed by blocks 403 and 404.

At "Select Intermediary/Send Session Information" block 403, computing device 300 may send to intermediary computing device 120, via the network, session information identifying client device 130. Computing device 300 may initially select intermediary computing device 120 from a plurality of available intermediary computing devices. For example, computing device 300 may select intermediary computing device 120 based on network locations of intermediary computing device 120 and client device 130, so that a network distance between intermediary computing device 120 and client device 130 is shorter than a network distance between server computing device 300 and client device 130. In some embodiments, computing device 300 may select an intermediary computing device from a plurality of available intermediary computing devices, wherein the selected intermediary computing device has a shortest network distance to client device 130 as compared to other available intermediary computing devices. Intermediary computing devices available for selection at block 403 may comprise, for example, one or more devices in a CDN or a MAN.

In some embodiments, server computing device 300 may include a system controller adapted to interact with a graphics rendering manager connected to a local network, as described in further detail herein with reference to FIG. 8-FIG. 12. Block 403 may include one or more interactions between the system controller and the graphics rendering manager. For example, the system controller may send, to the graphics rendering manager, a request to initiate intermediary graphics rendering in the local network for the client device 130. The system controller may receive, from the graphics rendering manager, an identification of a selected computing device in the local network, wherein the selected computing device is selected to serve as intermediary computing device 120 to conduct intermediary graphics rendering for the client device 130. Further operations which may be performed by the system controller and graphics rendering manager are described in connection with FIG. 8-FIG. 12.

Once computing device 300 selects intermediary computing device 120, computing device 300 may send session information to intermediary computing device 120. The session information may identify, to intermediary computing device 120, client device 130 and/or session information regarding the session between computing device 300 and client device 130. In some embodiments, block 403 may be incorporated into block 404, e.g., by including client device ID and/or session ID information in the compositing flow sent to intermediary computing device 120. In some embodiments, block 403 may be performed once per session with client device 130, and block 403 need not be repeated when subsequently sending compositing flow information to intermediary computing device 120. Block 403 may be followed by block 404.

At "Generate Compositing Flow" block 404, computing device 300 may generate a compositing flow. The compositing flow may comprise at least model IDs and model rendering information as a real-time graphics application 101 output resulting from processing, by real-time graphics application 101, inputs comprising application control instructions received from client device 130. The model rendering information may comprise, e.g., model position information, model orientation information, viewpoint information, light source information, texture information, and/or any other information as appropriate for rendering models to produce, e.g., rendered video graphics. The compositing flow may not include one or more models identified by the model IDs therein. Models not included in compositing flows may comprise, e.g., models previously sent to the intermediary computing device, e.g., at block 401 or 405.

Compositing flows may be generated using any hardware or software approach. For example, in some embodiments, compositing flow generator 102 may intercept a GPU instruction stream comprising GPU instructions and data, e.g., as may be generated for the purpose of local graphics rendering by a GPU at computing device 300. Compositing flow generator 102 may modify the intercepted GPU instruction stream as appropriate to include model IDs and rendering information recognizable by intermediary computing devices, thereby generating the compositing flow. In some embodiments, real-time graphics application 101 may render graphics with a GPU at computing device 300, and compositing flow generator 102 may use the locally rendered graphics, optionally in combination with GPU instruction stream information, to ascertain model IDs and rendering information to include in the compositing flow. In some embodiments, compositing flow generator 102 may comprise a modified GPU, which may be adapted to output a compositing flow comprising model IDs and rendering information instead of rendered graphics. In some embodiments, block 404 may include block 405.

At "Model Inclusion" block 405, computing device 300 may determine which models identified by model IDs in the compositing flow were previously sent to intermediary computing device 120, and computing device 300 may include, in the compositing flow, models not previously sent to intermediary computing device 120, while not including, in the compositing flow, some or all models previously sent to intermediary computing device 120. In embodiments wherein some or all models are not sent to intermediary computing device 120 at block 401, computing device 300 may include models in compositing flows.

In an example scenario, a compositing flow may initially reference model IDs for models A, B, and C, none of which have been previously sent to intermediary computing device 120. Block 405 may determine that models A, B, and C were not previously sent to intermediary computing device 120, and computing device 300 may include, in the initial compositing flow, models A, B, and C. The compositing flow may subsequently reference model IDs for models B, C, D, and E, wherein models B and C were previously sent to intermediary computing device 120, but models D and E have not been previously sent to intermediary computing device 120. Block 405 may determine that models B and C were previously sent to intermediary computing device 120 (in this case, models B and C were previously sent in the initial compositing flow) and that models D and E have not been previously sent to intermediary computing device 120. Computing device 300 may for example maintain and check a list of models previously sent to intermediary computing device 120. Computing device 300 may include, in the subsequent compositing flow, models D and E, while not including, in the subsequent compositing flow, models B and C. Block 405 may be followed by block 406.

At "Send Compositing Flow" block 406, computing device 300 may send, via the network, the compositing flow to intermediary computing device 120. Block 406 may be followed by graphics rendering at intermediary computing device 120 and delivery of rendered graphics from intermediary computing device 120 to client device 130. Client device 130 may send new application control instructions to computing device 300, which new application control instructions may be received at block 402. The loop comprising blocks 402, 404/405, and 406 may continue for the duration of the session between client device 130 and computing device 300/real-time graphics application 101.

Figure 5:
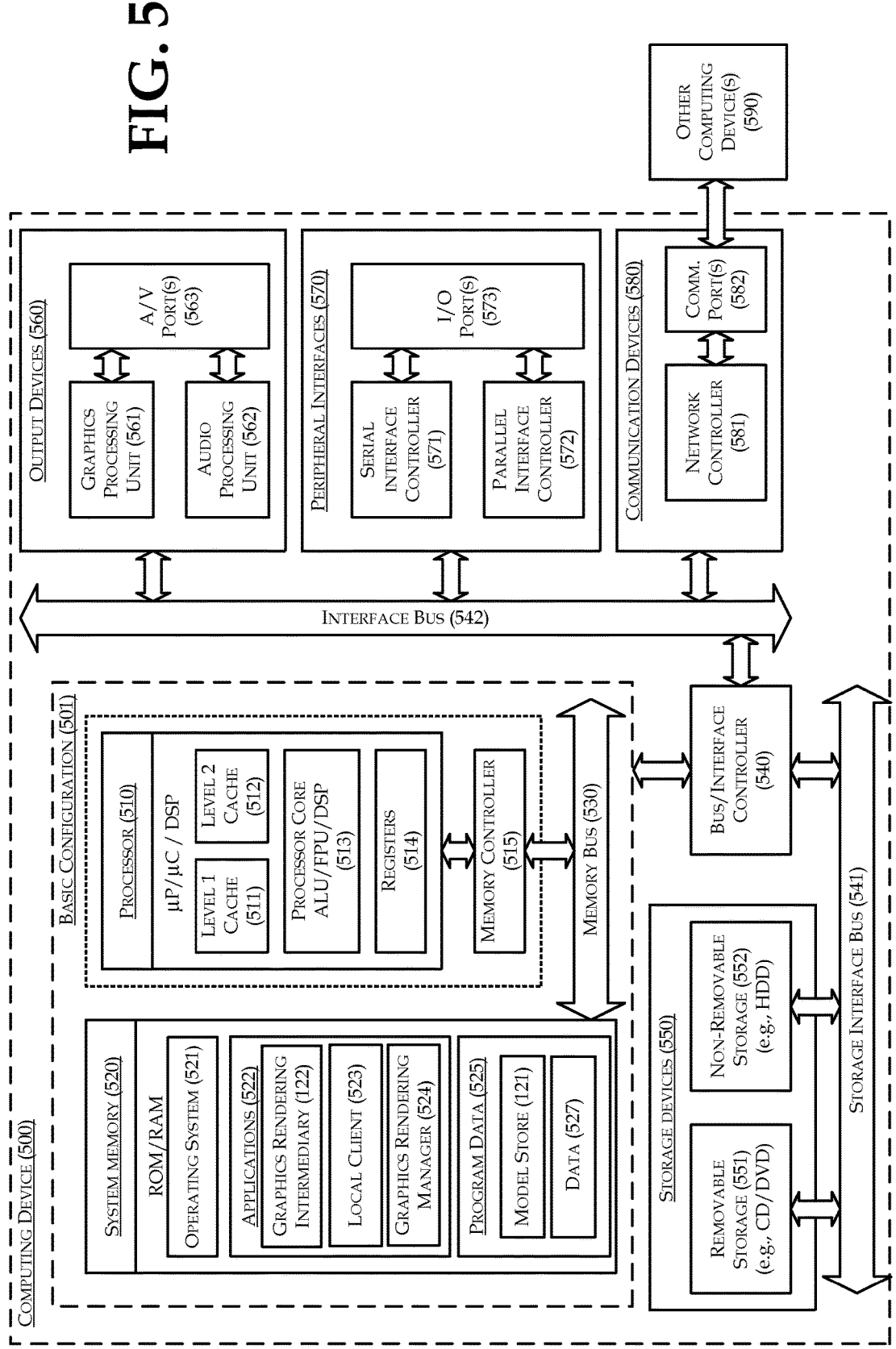
FIG. 5 is a block diagram of a computing device as one example of an intermediary computing device adapted to provide rendered graphics.

FIG. 5 is a block diagram of a computing device as one example of an intermediary computing device adapted to provide rendered graphics, arranged in accordance with at least some embodiments of the present disclosure. Computing device 500 also includes a local client 523 and a graphics rendering manager 524 adapted for use in connection with managing intermediary graphics rendering in a local network. Computing device 500 may generally be arranged with similar device components, connections, and properties as described in connection with computing device 300 in FIG. 3. Computing device 500 may differ from computing device 300 at least in part by being configured with different applications, such as applications 522, and different data, such as data 525. Computing device 500 may also have different hardware from computing device 300 as needed to support the various operations of an intermediary computing device and/or a graphics rendering manager, which hardware may be selected as appropriate to support embodiments of this disclosure.

In a very basic configuration 501, computing device 500 may include one or more processors 510 and system memory 520. A memory bus 530 may be used for communicating between the processor 510 and the system memory 520. Processor 510 may include one or more levels of caching, such as a level one cache 511 and a level two cache 512, a processor core 513, and registers 514. A memory controller 515 may also be used with the processor 510, or in some implementations the memory controller 515 may be an internal part of the processor 510.

System memory 520 may include an operating system 521, one or more applications 522, and program data 525. In some embodiments, operating system 521 may comprise a virtual machine that is managed by a Virtual Machine Manager (VMM). Applications 522 may include, for example, graphics rendering intermediary 122, local client 523, and/or graphics rendering manager 524. Program data 525 may include model store 121 and other data 527, such as session information and compositing flow information comprising model IDs and rendering information that may be used by graphics rendering intermediary 122, and/or collected graphics processing capability information for use by graphics rendering manager 524 as described herein.

Several different embodiments of this disclosure may be understood with reference to FIG. 5. In some embodiments, computing device 500 may include graphics rendering intermediary 122, local client 523, and graphics rendering manager 524, as illustrated in FIG. 5. In some embodiments, computing device 500 may include graphics rendering manager 524, and may omit local client 523 and graphics rendering intermediary 122. In some embodiments, computing device 500 may include local client 523 and graphics rendering intermediary 122, and may omit graphics rendering manager 524. In some embodiments, computing device 500 may include graphics rendering intermediary 122, and may omit local client 523 and graphics rendering manager 524.

Embodiments wherein computing device 500 may include graphics rendering intermediary 122, and may omit local client 523 and graphics rendering manager 524 may be deployed for example when computing device 500 is configured as an intermediary computing device that interacts with real-time graphics applications, without management of computing device 500 by a graphics rendering manager. For example, computing device 500 may comprise an intermediary computing device in a CDN or MAN, outside of local networks under management of graphics rendering managers.

Embodiments wherein computing device 500 may include graphics rendering manager 524, and may omit local client 523 and graphics rendering intermediary 122 may be deployed for example when computing device 500 is configured as a graphics rendering manager device for a local network, the local network comprising one or more other computing devices that may serve as intermediary computing devices selectable by graphics rendering manager 524, and wherein it is not desired to allow computing device 500 to also serve as an optional intermediary computing device in the local network. For example, computing device 500 may have less graphic processing capability than one or more other computing devices in the local network that may serve as intermediary computing devices, and it may therefore be undesirable to allow computing device 500 to serve as an optional intermediary computing device in the local network.

Embodiments wherein computing device 500 may include graphics rendering intermediary 122, local client 523, and graphics rendering manager 524, as illustrated in FIG. 5, may be deployed for example when computing device 500 is configured as a graphics rendering manager device for a local network, and wherein it is desired to allow computing device 500 to also serve as an optional intermediary computing device in the local network. For example, graphics rendering manager 524 at computing device 500 may collect graphics processing capability information that includes graphics processing capability of computing device 500 as well as, optionally, graphics processing capability of one or more other computing devices in the local network. Graphics processing capabilities of computing device 500 and/or other computing devices in the local network may be reported to graphics rendering manager 524 by local clients at each of the computing devices in the local network. Graphics rendering manager 524 may select computing device 500, or any other computing device in the local network that is arranged to serve as an intermediary computing device, to provide intermediary graphics rendering for a client in the local network.

In some embodiments, multiple computing devices in a local network may each include a graphics rendering intermediary, a local client, and a graphics rendering manager, such as computing device 500 as illustrated in FIG. 5. The multiple computing devices may select a best device in the local network to serve as a graphics rendering manager device. The selected graphics rendering manager device, e.g., computing device 500, may activate its graphics rendering manager 524 to operate in manager mode, to perform the graphics rendering management functions described herein. The other, not selected devices in the local network may operate their local clients and graphics rendering intermediaries in local client mode, unless and until subsequently selected to serve as the graphics rendering manager device for the local network.

Embodiments wherein computing device 500 may include local client 523 and graphics rendering intermediary 122, and may omit graphics rendering manager 524, may be deployed for example when computing device 500 is configured as an intermediary computing device in a local network that is managed by a graphics rendering manager at another device in the local network. For example, computing device 500 may have more graphics processing capability than one or more other computing devices in the local network, and so computing device 500 may be a good choice as an intermediary computing device. However, computing device 500 may be turned off more often than other devices in the local network, and so may be undesirable as a device to host a graphics rendering manager.

Computing device 500 may also include a bus/interface controller 540 to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and HDDs, optical disk drives such as CD drives or DVD drives, SSDs, and tape drives.

Computing device 500 may also include an interface bus 542 for facilitating communication from various interface devices to the basic configuration 501 via the bus/interface controller 540. Example output devices 560 include GPU 561, which may implement GPU 123 in FIG. 1 in some embodiments, and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate through either wired or wireless connections with external devices such as input devices or other peripheral devices via one or more I/O ports 573. An example communications device 580 includes a network controller 581, which may be arranged to facilitate communications with one or more other computing devices 590, such as server computing device 100 and client device 130 as illustrated in FIG. 1, over a network communication via one or more communication ports 582.

Computing device 500 may be implemented as a server computing device in a CDN, a MAN, or any other network comprising servers which may be closer to client device than servers running real-time graphics applications, such as server computing device 100. Computing device 500 may also be implemented as server in a distributed network of intermediary computing devices which may be operated by, e.g., an operator of real-time graphics applications.

Figure 6:
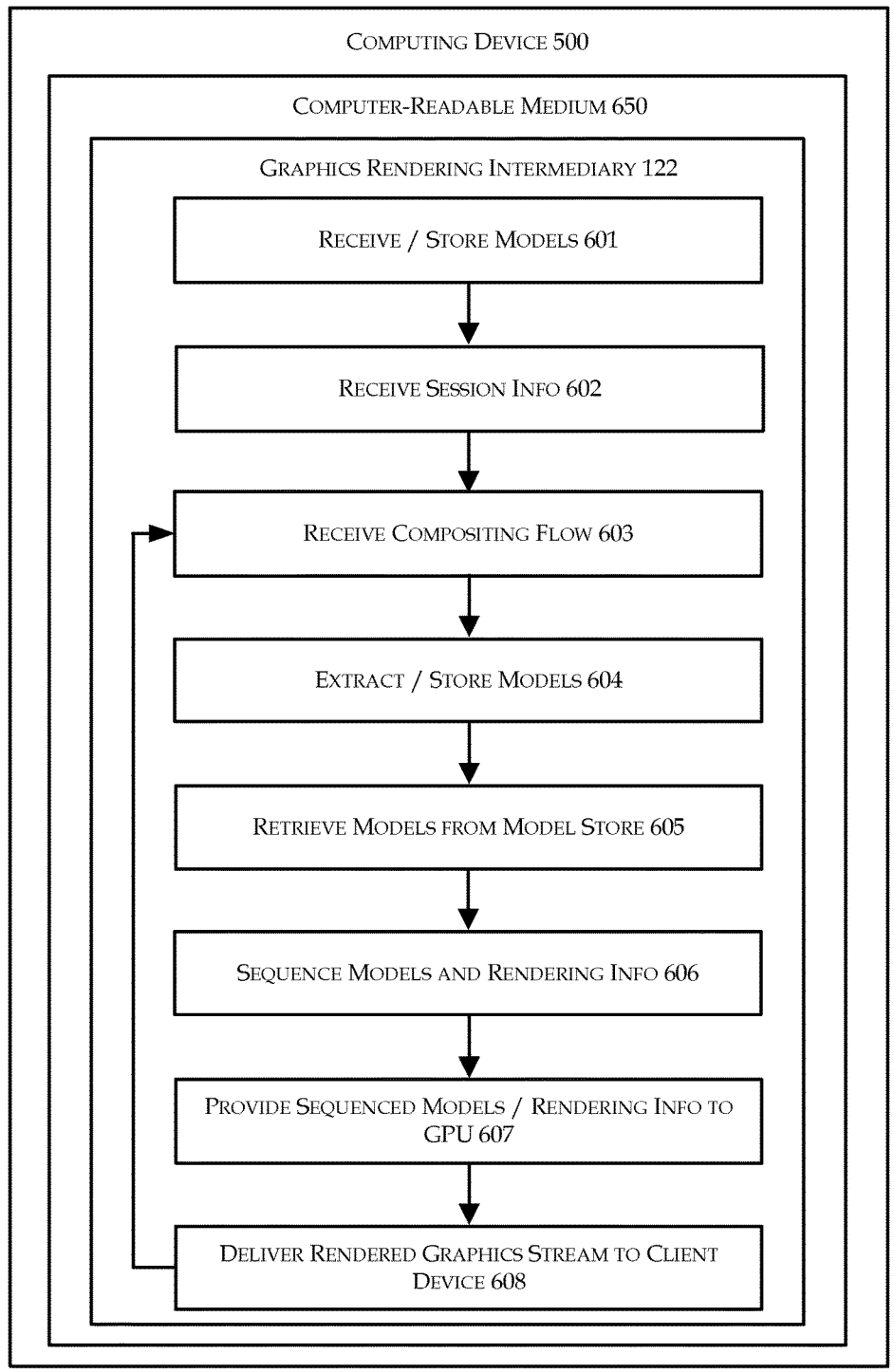
FIG. 6 is a flow diagram of example methods for rendering graphics by an intermediary computing device.

FIG. 6 is a flow diagram of example methods for rendering graphics by an intermediary computing device, arranged in accordance with at least some embodiments of the present disclosure. The example flow diagram may include one or more operations/modules as illustrated by blocks 601-608, which represent operations as may be performed in a method by graphics rendering intermediary 122, functional modules in a computing device 500, and/or instructions as may be recorded on a computer readable medium 650.

In FIG. 6, blocks 601-608 are illustrated as including blocks being performed sequentially, e.g., with block 601 first and block 608 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates example methods for rendering graphics by intermediary computing device 500. In FIG. 6, a "Receive/Store Models" block 601 precedes a session in which graphics are rendered and delivered to a client device. The session comprises a "Receive Session Info" block 602, followed by a loop comprising a "Receive Compositing Flow" block 603, an "Extract/Store Models" block 604, a "Retrieve Models From Model Store" block 605, a "Sequence Models and Rendering Info" block 606, a "Provide Sequenced Models/Rendering Info to GPU" block 607, and a "Deliver Rendered Graphics Stream to Client Device" block 608. The loop comprising blocks 603-608 need not necessarily be performed one block at a time. For example, in some embodiments blocks 603-608 may each operate substantially continuously, responsive to a substantially continuous compositing flow received at block 603. The loop comprising blocks 603-608 may operate throughout a session between the client device and a real-time graphics application—that is, for so long as the real-time graphics application delivers the compositing flow for the client device to intermediary computing device 500.

At "Receive/Store Models" block 601, computing device 500 may receive and store one or more models in a model store. Block 601 may comprise maintaining a lookup table for stored models, the lookup table comprising model IDs and pointers to memory locations in the model store where identified models are stored. Block 601 may comprise storing models in any desired locations, e.g., in a local memory at device 500 or at devices within a same local network as device 500. In some embodiments, block 601 may comprise mirroring and/or distributing a model store across multiple memory locations. Models may be received by delivery via a network or by any other approach such as by copying from a DVD or other computer readable medium. Some embodiments may omit block 601 and may rely instead on block 604 to receive and store models. Some embodiments may use combinations of blocks 601 and 604 to receive and store models. Block 601 may be followed by block 602.

At "Receive Session Info" block 602, computing device 500 may receive, via a network, session information from a server computing device, the session information identifying a client device. Session information may optionally identify multiple client devices, in which case graphics rendered from a compositing flow may optionally be delivered to the multiple client devices. In some embodiments, computing device 500 may store the received session information for use in delivery of a rendered graphics stream to the identified client device. Block 602 may be followed by block 603.

At "Receive Compositing Flow" block 603, computing device 500 may receive, via the network, a compositing flow provided by the server computing device. The compositing flow may comprise at least model IDs and model rendering information. In some embodiments, the compositing flow may comprise a substantially continuous stream of model IDs and model rendering information. The model IDs may identify models previously stored by computing device 500 in the model store. The model rendering information may comprise model position information, model orientation information, viewpoint information, texture information, light source information, and/or any other model rendering information. In some embodiments, the compositing flow may occasionally comprise one or more models not in the model store, which models may be extracted and stored in the model store at block 604. Block 603 may be followed by block 604.

At "Extract/Store Models" block 604, computing device 500 may extract models from the compositing flow received at block 603. For example, when a full model is included in the received composting flow, in addition to the model IDs and rendering information normally included in the composting flow, block 604 may extract the full model for storage and later use in connection with subsequent portions of the compositing flow and/or subsequent graphics rendering for the real-time graphics application. Block 604 may store extracted models in the model store. In some embodiments, block 604 may optionally also provide extracted models directly to block 605 for immediate use in graphics rendering. Block 604 may be followed by block 605.

At "Retrieve Models from Model Store" block 605, computing device 500 may retrieve models identified in the received compositing flow from the model store. Computing device 500 may for example read the received compositing flow information to identify model IDs therein. Computing device 500 may lookup model IDs referenced in the received compositing flow in a lookup table to determine memory locations for identified models in the model store. Computing device 500 may copy the identified models from their memory locations in the model store to another memory location, e.g., to a CPU cache, a graphics card memory, a GPU cache, a SSD storage device, disk storage, or other memory from which the identified models may be sent to a GPU for rendering. Block 605 may be followed by block 606.

At "Sequence Models and Rendering Info" block 606, computing device 500 may sequence the identified models retrieved at block 605 with rendering information from the compositing flow. The rendering information in the received compositing flow may include rendering information for one or more different models, and the rendering information may include sequencing information specifying rendering operations to be carried out in sequential video frames. Block 606 may sequence the models by sending models to the GPU in an appropriate order and at appropriate times when the models are needed at the GPU, as well as by sending rendering information to the GPU in an appropriate order so that sequential video frames are rendered according to the sequence specified in the compositing flow. Block 606 may be followed by block 607.

At "Provide Sequenced Models/Rendering Info to GPU" block 607, computing device 500 may provide the identified models from the model store and model rendering information from the received compositing flow, as sequenced at block 606, to a GPU for rendering, thereby causing the GPU to render graphics according to the received compositing flow.

The GPU may be a local GPU, e.g., in a same device housing as other components of computing device 500, or the GPU may be otherwise operably coupled with computing device 500. For example, in some embodiments multiple computing devices may share a same high performance graphics card comprising the GPU. Furthermore, in some embodiments multiple instances of graphics rendering intermediary 122, at computing device 500 and/or other computing devices in a same LAN as computing device 500, may share GPU resources. For example, methods such as illustrated in FIG. 6 may be performed multiple times in substantially simultaneous fashion, using a same GPU or one or more shared GPUs, to simultaneously provide rendered graphics to multiple clients according to multiple different compositing flows.

In some embodiments, block 607 may comprise rendering, by the GPU, graphics for delivery via the network to the client device at block 608. The rendered graphics may comprise the identified models from the model store rendered according to model rendering information in the compositing flow. For example, the identified models may be positioned according to model position information, oriented according to model orientation information, viewed according to viewpoint information, lighted according to light source information, textured according to texture information, and/or otherwise rendered according to model rendering information in the compositing flow. Block 607 may be followed by block 608.

At "Deliver Rendered Graphics Stream to Client Device" block 608, computing device 500 may deliver, via a network, a rendered graphics stream output produced by the GPU to the client device. The rendered graphics stream output may comprise the identified models from the model store positioned and/or otherwise rendered according to the model position information in the compositing flow, as generated pursuant to block 607. In some embodiments, computing device 500 may deliver, along with the rendered graphics stream, audio, tactile or other output information for playback at the client device along with the rendered graphics stream. For example, computing device 500 may merge audio or tactile information received along with a compositing flow into rendered graphics stream data for delivery to the client device. In some embodiments, another device coupled in a LAN with computing device 500 may include block 608—for example, rendered graphics streams may be forwarded from a GPU to a dedicated stream server responsible for streaming graphics to client devices. In some embodiments, block 608 may be followed by return to block 603 for continuous operation of the loop comprising blocks 603-608. In some embodiments, block 608 as well as blocks 603-607 may operate substantially continuously to deliver a substantially continuous rendered graphics stream output from the GPU to the client device.

Figure 7:
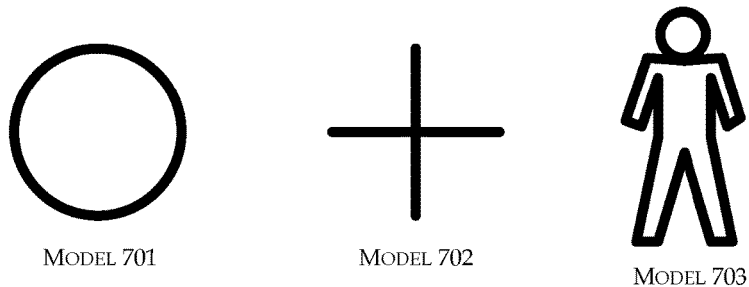
FIG. 7 is a diagram illustrating example models, an example compositing flow, and an example rendered graphics stream.
Figure 7:
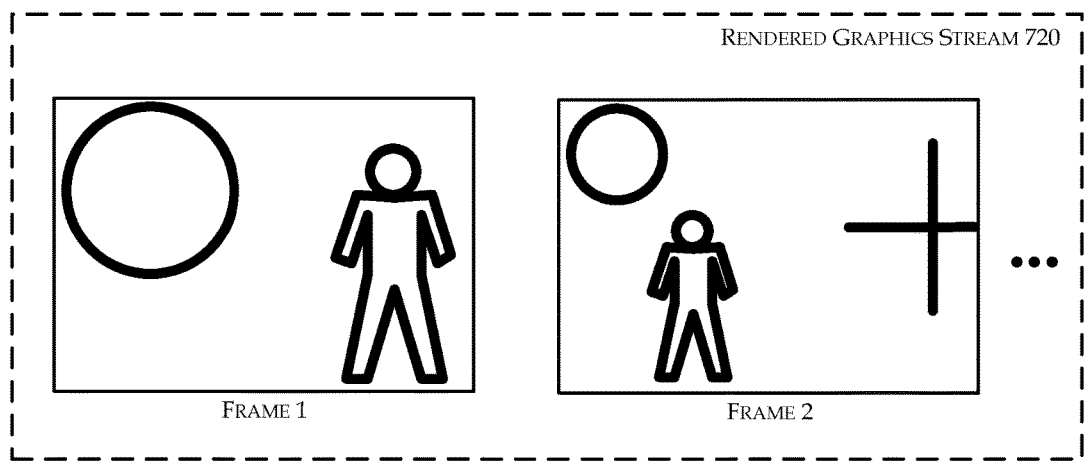

FIG. 7 is a diagram illustrating example models, an example compositing flow, and an example rendered graphics stream, arranged in accordance with at least some embodiments of the present disclosure. FIG. 7 includes a model 701, a model 702, and a model 703, a compositing flow 710, and a rendered graphics stream 720, comprising a frame 1 and a frame 2.

Models 701, 702, and 703 may be delivered to an intermediary computing device and stored in a model store, as described herein. Compositing flow 710 may be received at the intermediary computing device and used along with models 701, 702, and 703 to generate rendered graphics stream 720 for delivery to a client device. Compositing flow 710 includes a sequence of frames comprising frame 1 and frame 2, and simplified rendering information for each frame. For example, rendering information for frame 1 includes model IDs for models 701 and 703. A position X1, Y1 and an orientation O1 is specified for model 701, and a position X2, Y2 and an orientation O2 is specified for model 703. Rendering information for frame 2 includes model IDs for models 701, 702, and 703. A position X3, Y3 and an orientation O3 is specified for model 701, a position X4, Y4 and an orientation O4 is specified for model 703, and a position X5, Y5 and an orientation O5 is specified for model 702. In this example, position information may be understood as including "environmental" positions for models 701, 702, 703, and further position information may specify "internal" positions for models 701, 702, 703, as will be appreciated. Compositing flow 710 may comprise further rendering information, e.g., a substantially continuous stream of rendering information including a stream of different rendering instructions for models 701, 702, and 703.

Rendered graphics stream 720 may be generated at the intermediary computing device, and delivered to the client device, as described herein. Rendered graphics stream 720 may comprise rendered frames, such as rendered frame 1 and rendered frame 2, which are rendered using models 701, 702, and 703 and rendering information in compositing flow 710. Rendered graphics stream 720 may comprise further rendered frames rendered according to further rendering information as may be included in compositing flow 710. For example, rendered frame 1 includes model 701 in an example position X1, Y1 and an orientation O1, and model 703 in an example position X2, Y2 and an orientation. Rendered frame 2 includes model 701 in an example position X3, Y3 and an orientation O3, model 703 in an example position X4, Y4 and an orientation O4, and model 702 in an example position X5, Y5 and an orientation O5.

Figure 8:
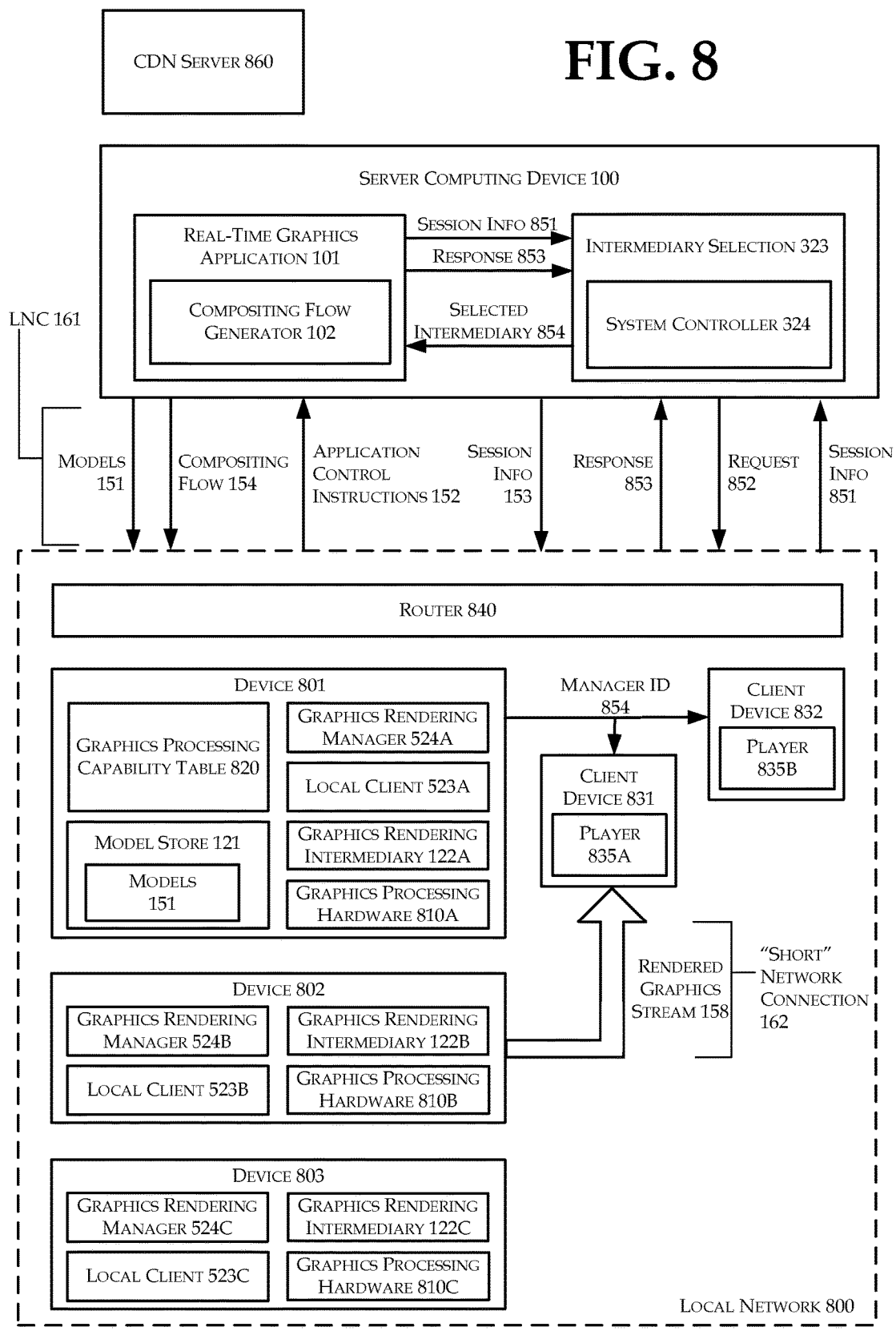
FIG. 8 is a diagram illustrating an example local network configured to manage intermediary graphics rendering.

FIG. 8 is a diagram illustrating an example local network configured to manage intermediary graphics rendering, arranged in accordance with at least some embodiments of the present disclosure. FIG. 8 comprises a local network 800, server computing device 100, and a CDN server 860. Local network 800 comprises, inter alia, a device 801 comprising a graphics rendering manager 524A. Graphics rendering manager 524A may be configured to select a computing device in local network 800, such as device 801, a device 802 or a device 803, to serve as an intermediary computing device to conduct intermediary graphics rendering for a client, such as a client device 831 or a client device 832. Graphics rendering manager 524A may interact with real-time graphics application 101 at server computing device 100 to direct compositing flow 154 to the selected device to enable the selected device to render graphics for delivery to the client.

In an example embodiment wherein a user plays a video game at client device 831, a player 835A at client device 831 may be configured to initiate a communication session with real-time graphics application 101 by, inter alia, sending session information 851 to real-time graphics application 101. Session information 851 may comprise a manager ID 854 which identifies graphics rendering manager 524A, as well as any other information to establish the communication session, such as a network address for client device 831, identity and/or credential information for the user, player 835A, and/or client device 831.

Real-time graphics application 101 may be configured to determine an appropriate intermediary computing device for the communication session with client device 831. For example, real-time graphics application 101 may provide session information 851 to intermediary selection module 323. Intermediary selection module 323 may be adapted to select an appropriate intermediary computing device for the communication session with client device 831, and to identify the selected intermediary computing device to real-time graphics application 101 as selected intermediary 854. Intermediary selection module 323 may comprise, inter alia, a system controller 324 adapted to select an appropriate intermediary computing device in local network 800 for the communication session with client device 831. System controller 324 may be configured to interact with graphics rendering manager 524A to determine whether local network 800 comprises any available intermediary computing devices. Intermediary selection module 323 may also be configured to determine whether any computing devices outside of local network 800, such as CDN server 860, are available to serve as intermediary computing devices for the communication session.

To determine whether local network 800 comprises any available intermediary computing devices, system controller 324 may be configured to send a request 852 to the graphics rendering manager identified by received manager ID 854, namely, to graphics rendering manager 524A. In some embodiments, system controller 324 may be configured to identify graphics rendering manager 524A as the destination for request 852 using a look-up operation, instead of from a manager ID included in session information 851. For example, system controller 324 may look up a graphics rendering manager corresponding to client device 831 in a table or other data structure maintained by real-time graphics application 101. Request 852 may comprise a request to initiate intermediary graphics rendering in local network 800 for client device 831.

In response to request 852, graphics rendering manager 524A may be configured to select, based on collected graphics processing capability information, a computing device from among the computing devices 801, 802, 803 in local network 800. In examples set forth herein, graphics rendering manager 524A may for example select device 802. Selected device 802 may be selected to serve as an intermediary computing device to conduct intermediary graphics rendering for client device 831. In some embodiments, collected graphics processing capability information may be stored for example in a graphics processing capability table 820. Graphics rendering manager 524A may select a computing device based on collected graphics processing capability information at least in part by applying intermediary selection rules to graphics processing capability table 820.

Graphics rendering manager 524A may send, to real-time graphics application 101, a response 853 to request 852. Response 853 may indicate intermediary graphics rendering capability at local network 800 and/or identify selected computing device 802 to real-time graphics application 101. For example, in some embodiments, response 853 may affirm that local network 800 currently has intermediary graphics rendering capability, and response 853 may comprise an identifier, such as a network address or other identifier, for selected computing device 802.

In some embodiments, response 853 may comprise a "yes" or "no" indication, without necessarily identifying selected computing device 802 to real-time graphics application 101. A "yes" indication may for example indicate that local network 800 comprises at least one device available to serve as an intermediary computing device for client device 831. A "no" indication may for example indicate that local network 800 does not currently comprise a device available to serve as an intermediary computing device for client device 831.

In some embodiments, response 853 may include collected graphics processing capability information, e.g., from graphics processing table 820. In embodiments in which response 853 includes collected graphics processing capability information, real-time graphics application 101 may be configured to participate in selecting an intermediary computing device in local network 800, as described herein.

In some embodiments, by configuring and sending response 853, graphics rendering manager 524A may effectively direct compositing flow 154 to selected computing device 802 to enable selected computing device 802 to render graphics for delivery to client device 831. For example, when response 853 identifies selected computing device 802, response 853 may cause real-time graphics application 101 to direct compositing flow 154 to selected computing device 802. When response 853 does not identify selected computing device 802 to server computing device 100, but response 853 instead includes, e.g., a "yes" indication that local network 800 comprises at least one device available to serve as intermediary computing device for client device 831, response 853 may cause real-time graphics application 101 to direct compositing flow 154 to graphics rendering manager 524A, and graphics rendering manager 524A may be configured to receive and forward compositing flow 154 to selected computing device 802.

In embodiments wherein response 853 includes collected graphics processing capability information, and real-time graphics application 101 participates in selecting an intermediary computing device, graphics rendering manager 524A may select which of devices 801, 802, or 803 to include in the collected graphics processing capability information provided to real-time graphics application 101. Response 853 may therefore effectively direct compositing flow 154 to a selected computing device from among devices selected for identification within information provided to real-time graphics application 101.

Real-time graphics application 101 may be configured to receive response 853 and provide response 853 to system controller 324 for processing. When response 853 indicates intermediary graphics rendering capability at local network 800, system controller 324 may be configured to direct compositing flow 154 to local network 800. For example, when response 853 identifies selected computing device 802, system controller 324 may be configured to direct compositing flow 154 to selected computing device 802. When response 853 identifies a "yes" indication without identifying a selected computing device, system controller 324 may be configured to direct compositing flow 154 to graphics rendering manager 524A for forwarding to a locally selected device as appropriate. When response 853 includes graphics processing capabilities of multiple selected devices, system controller 324 may be configured to select a device, e.g., selected device 802 from among the multiple selected devices, and to direct compositing flow 154 to selected computing device 802.

To direct compositing flow 154 to local network 800, system controller 324 may for example identify, to intermediary selection module 323, a selected computing device within local network 800, e.g., device 801 or device 802, as an available local network intermediary computing device. Intermediary selection module 323 may in turn identify, to real-time graphics application 101, the selected computing device within local network 800 as selected intermediary 854. In some circumstances, intermediary selection module 323 may instead select any other available intermediary computing devices, such as CDN server 860, as selected intermediary 854, and such a selection may optionally be made despite availability of an intermediary computing device within local network 800, as will be appreciated.

Real-time graphics application 101 may be configured to direct compositing flow 154 to selected intermediary 854. For example, when device 802 is identified as selected intermediary 854, real-time graphics application 101 may send session information 153 to selected computing device 802, real-time graphics application 101 may commence receiving application control instructions 152 from client device 831, and real-time graphics application 101 may send compositing flow 154 to selected computing device 802 for real-time graphics rendering and delivery to client device 831, as described herein, e.g., with reference to FIG. 1.

In the event that there are no computing devices in local network 800 that are available to serve as intermediary computing device for client device 831, response 853 may indicate no intermediary graphics rendering capability at local network 800. System controller 324 may be configured to notify intermediary selection module 323 that no suitable intermediary computing devices are available at local network 800. Intermediary selection module 323 may select an intermediary computing device outside of local network 800, such as CDN server 860. In the event that intermediary computing devices are available neither within local network 800 nor outside of local network 800, intermediary selection module 323 may be configured to notify real-time graphics application 101 of such unavailability. Real-time graphics application 101 may render graphics locally at server computing device 100 (or within a same data center as server computing device 100), and server computing device 100 may deliver a rendered graphics stream to client device 831 via "long" network connection 161.

In some embodiments, an order of preference implemented at real-time graphics application 101 may comprise first, the use of an intermediary computing device in local network 800; next, an intermediary computing device outside of local network 800; and finally, local graphics rendering at server computing device 100. Other embodiments may apply different orders of preference as will be appreciated. In some embodiments, orders of preference for intermediary graphics rendering may also account for graphics processing capabilities of available intermediary computing devices, costs associated with the use of each of the available intermediary computing devices, and/or network length of each of the "short" network connections between available intermediary computing devices and client device 831.

Selected computing device 802 may be configured to receive compositing flow 154, and to use compositing flow 154 and models 151 in model store 121 to generate and deliver rendered graphics stream 158 to client device 831, as described herein. Selected computing device 802 may optionally compress rendered graphics stream 158 to a compressed video format, such as h.264, h.265, or any other compressed video format, before sending rendered graphics stream 158 to client device 831, thereby lowering the use of communication bandwidth within local network 800. Player 835A may be configured to receive rendered graphics stream 158 from selected computing device 802, to optionally decompress and display rendered graphics stream 158, and to continue sending application control instructions 152 to real-time graphics application 101, as described herein with reference to FIG. 12.

In some embodiments, graphics rendering manager 524A and/or real-time graphics application 101 may be configured to select backup intermediary computing devices. Backup intermediary computing devices may render graphics for client device 831 in the event of a failure of an initially selected intermediary computing device, e.g., failure of selected device 802. Backup selection is particularly appropriate when local network intermediary computing devices are used, as devices in local networks are generally less reliable than devices in data centers. Local network devices may occasionally be turned off, carried out of range of the local network, and/or used for purposes other than intermediary graphics rendering, thereby diminishing their capacity for intermediary graphics rendering. Graphics rendering manager 524A may be configured to select a backup computing device from among the computing devices 801, 802, and 803 based on collected graphics processing capability information. For example, graphics rendering manager 524A may select device 801 as a backup computing device, to serve as a backup intermediary computing device to conduct intermediary graphics rendering for client device 831 when selected computing device 802 is unavailable for intermediary graphics rendering.

In some embodiments, graphics rendering manager 524A may be configured to identify backup computing device 801 to real-time graphics application 101, e.g., in response 853. Real-time graphics application 101 may be configured to receive and store the identification of backup computing device 801. Real-time graphics application 101 may provide the identification of backup computing device 801 to system controller 324. System controller 324 and/or intermediary selection module 323 may for example apply order of preference processing to available backup computing devices, and intermediary selection module 323 may be configured to maintain a prioritized list of available backup computing devices for the communication session between real-time graphics application 101 and client device 831.

In some embodiments, player 835A may be configured to detect failure or latency of rendered graphics stream 158, and to notify real-time graphics application 101 of a detected failure or latency. Real-time graphics application 101 may deem selected device 802 as unavailable to serve as an intermediary computing device, in view of the failure or latency. Real-time graphics application 101 may be configured to direct compositing flow 154 to backup computing device 801 to enable backup computing device 801 to render graphics for delivery to client device 801. Real-time graphics application 101 may for example direct session information 153 and compositing flow 154 to backup computing device 801 in response to the failure or latency notification.

In some embodiments, player 835A and/or an initially selected intermediary computing device 802 may be configured to detect failure or latency of rendered graphics stream 158, and to notify graphics rendering manager 524A the detected failure or latency. Furthermore, in some embodiments selected intermediary computing device 802 may be configured to detect conditions at device 802 which may be likely to cause failure or latency of rendered graphics stream 158, such as a change in a use state at device 802 and/or a disconnection of device 802 from wall power. Device 802 may be configured to notify graphics rendering manager 524A of the potential failure or latency. Graphics rendering manager 524A may be configured to switch intermediary graphics rendering to a selected backup device, e.g., switch rendering operations to device 801, in response to the detected and/or potential failure or latency. Graphics rendering manager 524A may optionally also notify real-time graphics application 101 of the switch.

In FIG. 8, local network 800 comprises a router 840, device 801, device 802, device 803, client device 831, and client device 832. Router 840 is an example of network equipment used to establish local network 800, and additional or different network equipment may be used to establish local network 800 in some embodiments. Devices 801, 802, and 803 and client devices 831 and 832 may comprise any types of computing devices. Local network 800 may comprise additional or fewer devices such as 801, 802, and 803, and additional or fewer client devices 831 and 832 in some embodiments.

Device 801 comprises graphics processing capability table 820 and model store 121, and model store 121 comprises models 151. Device 801 furthermore comprises graphics rendering manager 524A, a local client 523A, a graphics rendering intermediary 122A, and graphics processing hardware 810A. Device 802 also comprises a graphics rendering manager 524B, a local client 523B, a graphics rendering intermediary 122B, and graphics processing hardware 810B. Device 802 also comprises a graphics rendering manager 524C, a local client 523C, a graphics rendering intermediary 122C, and graphics processing hardware 810C. Client device 831 comprises player 835A, and client device 832 comprises a player 835B.

In some embodiments, devices 801, 802, and 803 may comprise devices with relatively more powerful graphics processing capabilities, while client devices 831 and 832 may comprise devices with relatively less powerful graphics processing capabilities. The terms "more" and "less" powerful in this context are relative to other devices in local network 800, so that devices 801, 802, and 803 may have more powerful graphics processing capabilities than client devices 831 and 832. Devices 801, 802, and 803 may for example comprise laptop and desktop type computing devices with more powerful GPU processors and larger memories than client devices 831 and 832. Client devices 831 and 832 may for example comprise smart phone and tablet type computing devices. In some embodiments, devices 801, 802, and 803 may be equipped, e.g., with an application including a graphics rendering manager, a local client, and a graphics rendering intermediary, as shown in FIG. 8. Client devices 831 and 832 may be equipped, e.g., with an application including a player, as also shown in FIG. 8. It will be appreciated that other embodiments may include, e.g., equipping all of devices 801, 802, 803, 831, and 832 with an application including a graphics rendering manager, a local client, a graphics rendering intermediary, and a player. Such other embodiments may facilitate set-up by allowing all devices 801, 802, 803, 831, and 832 to be equipped with a same application.

In some embodiments, any of devices 801, 802, and 803 may be equipped to serve as an intermediary computing device configured to conduct intermediary graphics rendering for other devices in local network 800. For example, devices 801, 802, and 803 may comprise instances of intermediary computing device 120 as illustrated in FIG. 1. Devices 801, 802, and 803 may comprise graphics rendering intermediaries 122A, 122B, and 122C, respectively, each of which may comprise an instance of graphics rendering intermediary 122 as illustrated in FIG. 1 and FIG. 2. Devices 801, 802, and 803 may comprise graphics processing hardware 810A, 810B, and 810C, respectively, such as GPUs or other processors which may serve as GPU 123 as illustrated in FIG. 1, and/or other graphics processing hardware. Model store 121 may be located at any suitable device within local network 800. In some embodiments, model store 121 may be distributed among devices 801, 802, and 803 or other memory locations in local network 800. In some embodiments, model store 121 may mirrored at two or more of devices 801, 802, and 803, so that two or more of devices 801, 802, and 803 have a local copy of model store 121.

One or more of devices 801, 802, and 803 in local network 800 may be equipped to serve as a graphics rendering manager device. In some embodiments, one device in local network 800 may be equipped with a graphics rendering manager, e.g., device 801 may be equipped with graphics rendering manager 524A, while other devices 802, 803 need not comprise graphics rendering managers. The one device 801 equipped with graphics rendering manager 524A may perform the various graphics rendering manager methods described herein.

In some embodiments, multiple of devices 801, 802, and 803 may comprise graphics rendering managers, such as graphics rendering managers 524A, 524B, and 524C, respectively, as illustrated in FIG. 8. Graphics rendering managers 524A, 524B, and 524C may be configured to select a graphics rendering manager for local network 800. The selected graphics rendering manager, e.g., graphics rendering manager 524A, may perform the various graphics rendering manager methods described herein.

Any manager selection criteria may be used to select a graphics rendering manager for local network 800. Example manager selection criteria may comprise device uptime, device processing power, device memory size, and/or device usage history, any of which may be used as manager selection criteria either alone or in combination with other manager selection criteria.

In some embodiments, graphics rendering managers 524A, 524B, and 524C may be configured to query devices 801, 802, and 803, respectively, for manager selection criteria information. Graphics rendering managers 524A, 524B, and 524C may be configured to exchange manager selection criteria with one another, and to select a graphics rendering manager at a device that is best suited to serve as a graphics rendering manager device for local network 800. For example, when manager selection criteria comprises device uptime, graphics rendering managers 524A, 524B, and 524C may select a graphics rendering manager at a device with the longest uptime intervals, i.e., the device that is most likely to remain on, based on historical device state patterns.

The non-selected graphics rendering managers, e.g., graphics rendering managers 524B and 524C, may remain inactive, unless the selected graphics rendering manager 524A is deactivated, such as by device 801 being turned off or disconnected from local network 800. In the event that selected graphics rendering manager 524A is deactivated, graphics rendering managers 524B and 524C may be configured to re-select a graphics rendering manager for local network 800. For example, in some embodiments graphics rendering managers 524A, 524B, and 524C may be configured to periodically communicate with one another, to detect based on failure of a graphics rendering manager to periodically communicate that such graphics rendering manager has been at least temporarily deactivated, and to re-select a graphics rendering manager for local network 800 in the event of a detected failure of selected graphics rendering manager 524A.

Once selected as graphics rendering manager for local network 800, graphics rendering manager 524A may perform the various methods for managing intermediary graphics rendering in local network 800 described herein. Example methods may generally comprise manager set-up operations to prepare graphics rendering manager 524A for intermediary selection, and intermediary selection operations to support real-time graphics rendering, in local network 800, for a client device such as 831 or 832 in local network 800. Example methods for managing intermediary graphics rendering in local network 800 are described in further detail in connection with FIG. 9.

FIG. 8 illustrates "long" network connection 161 as a connection between server computing device 100 and local network 800, while "short" network connection 162 is illustrated as a connection between devices within local network 800, e.g., between device 802 and client device 831. It will be appreciated that any connection between devices in local network 800 is shorter than the connection between remote server computing device 100 and local network 800, and therefore the connection between server computing device 100 and local network 800 is properly understood as "long" network connection 161 while the connection between devices in local network 800 is properly understood as "short" network connection 162.

Figure 9:
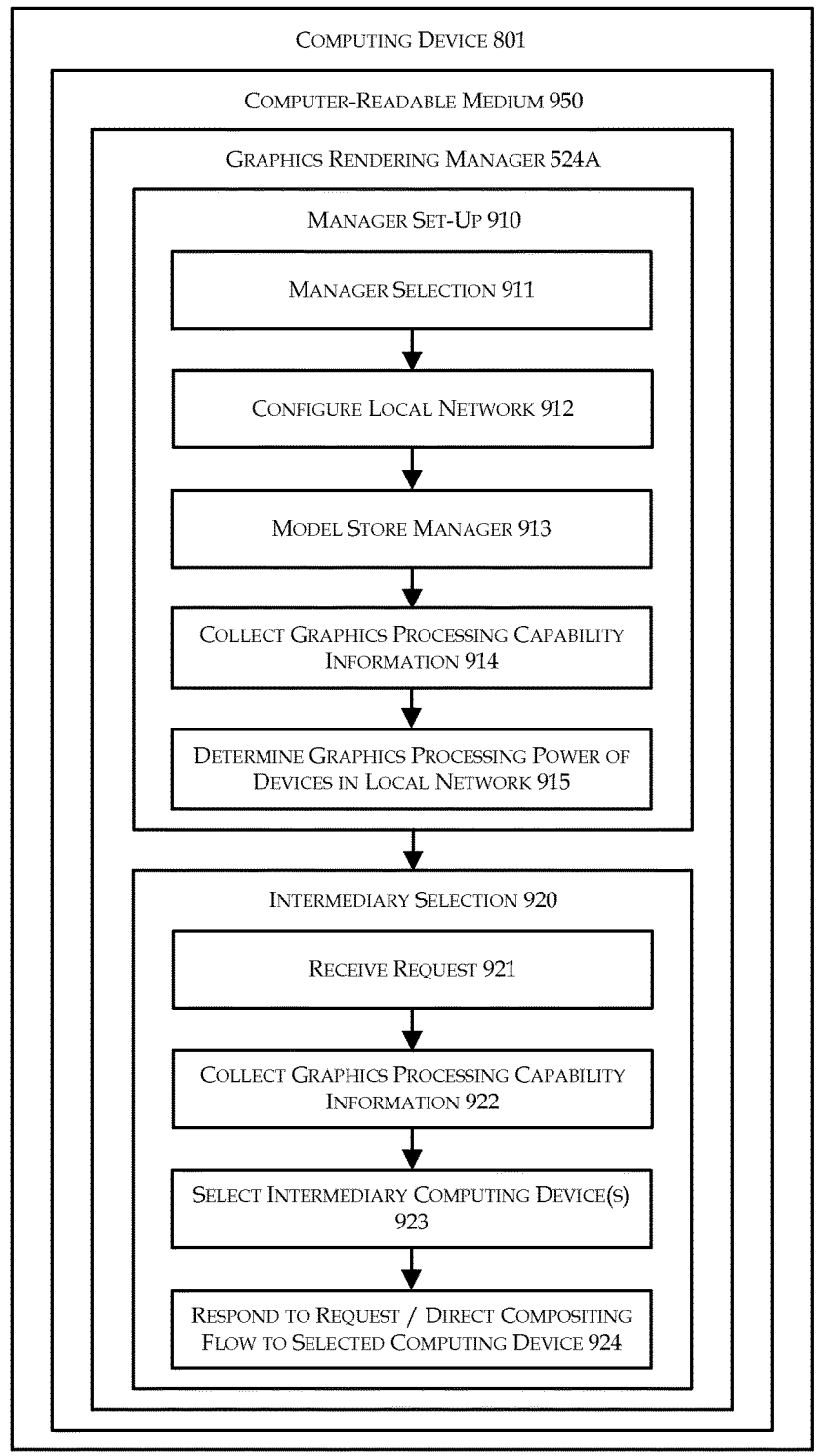
FIG. 9 is a flow diagram of example methods for managing intermediary graphics rendering in a local network.

FIG. 9 is a flow diagram of example methods for managing intermediary graphics rendering in a local network, arranged in accordance with at least some embodiments of the present disclosure. The example flow diagram may include one or more operations/modules as illustrated by blocks 910-915 and 920-924, which represent operations as may be performed by graphics rendering manager 524A, functional modules in a computing device 801, and/or instructions as may be recorded on a computer readable medium 950.

In FIG. 9, blocks 910-915 and 920-924 are illustrated as including blocks being performed sequentially, e.g., with block 911 first and block 915 last among the manager set-up blocks 910, and with block 921 first and block 924 last among the intermediary selection blocks 920. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

In FIG. 9, operations of graphics rendering manager 524A are divided into manager set-up operations at a "Manager Set-Up" block 910, and intermediary selection operations at an "Intermediary Selection" block 920. Graphics rendering manager 524A and/or a user configuring graphics rendering manager 524A at computing device 801 may perform the manager set-up operations of block 910 any time prior to the intermediary selection operations of block 920. For example, in some embodiments graphics rendering manager 524A may perform manager set-up block 910 once, and graphics rendering manager 524A may optionally occasionally repeat some or all of manager set-up block 910 thereafter. Graphics rendering manager 524A may perform intermediary selection block 920 in connection with each new session between a client device at local network 800 and a real time graphics application. In some embodiments, graphics rendering manager 524A may repeat intermediary selection block 920 as often as necessary, without necessarily repeating manager set-up block 910.

"Manager Set-Up" block 910 may comprise, inter alia, a "Manager Selection" block 911, a "Configure Local Network" block 912, a "Model Store Manager" block 913, a "Collect Graphics Processing Capability Information" block 914, and a "Determine Graphics Processing Power of Devices in Local Network" block 915. In some embodiments, graphics rendering manager 524A may initiate block 910 as part of, or in response to, installation of graphics rendering manager 524A at computing device 801. In some embodiments, block 910 may be performed at least in part by a user pursuant to installation of graphics rendering managers 524A, 524B, and 524C, local clients 523A, 523B, and 523C, and/or graphics rendering intermediaries 122A, 122B, and 122C at computing devices 801, 802, and 803 in local network 800.

At "Manager Selection" block 911, graphics rendering manager 524A and/or a user may select a graphics rendering manager for the local network comprising computing device 801. For example, multiple installed graphics rendering managers may cooperate to exchange manager selection criteria and to select, e.g., graphics rendering manager 524A, for local network 800 as described above with reference to FIG. 8. In general, a selected graphics rendering manager is preferably one that is installed at a device that is continuously, or substantially continuously, on, connected to local network 800, connected to the Internet, and has sufficient processing power to conduct the various graphics rendering manager operations described herein simultaneously with other common uses of the device.

In some embodiments, a user may be instructed to select an appropriate device within local network 800 on which to install graphics rendering manager 524A. Block 911 may comprise selecting the appropriate device within local network 800 and installing graphics rendering manager 524A at the selected device.

In some embodiments, block 911 may comprise retrieving or requesting, by an installed graphics rendering manager 524A, manager selection criteria from multiple devices in local network 800. Graphics rendering manager 524A may identify, based on the retrieved or requested manager selection criteria, an appropriate device to host graphics rendering manager 524A, as described herein. Graphics rendering manager 524A may then perform or otherwise facilitate transfer of graphics rendering manager 524A to the identified appropriate device, as well as installation of graphics rendering manager 524A at the identified appropriate device. Block 911 may be followed by block 912.

At "Configure Local Network" block 912, graphics rendering manager 524A and/or a user may configure one or more devices in local network 800 to serve as graphics rendering intermediaries, and graphics rendering manager 524A and/or the user may configure one or more devices in local network 800 as client devices adapted to make use of the graphics rendering intermediaries. For example, in some embodiments, the user may be instructed to select appropriate devices within local network 800 on which to install local clients such as local clients 523A, 523B, and 523C, and on which to install graphics rendering intermediaries such as graphics rendering intermediaries 122A, 122B, and 122C. Block 912 may comprise selecting the appropriate devices, e.g., devices 801, 802, and 803 within local network 800 and installing local clients and graphics rendering intermediaries at the selected devices. In general, appropriate devices for local clients and graphics rendering intermediaries may be those that have sufficiently powerful graphics processing hardware to serve as real-time graphics rendering intermediaries. The recommended amount of graphics processing power may depend on the rendering demands made by real-time graphics applications.

The user may furthermore be instructed to select appropriate devices within local network 800 on which to install players adapted to make use of the graphics rendering intermediaries, e.g., the user may install players 835A and 835B at client devices 831, 832. In general, appropriate client devices for installation of players may comprise devices that are connectable to a local network comprising graphics rendering intermediaries, used to access real-time graphics applications, and which may not have sufficient local graphics processing power to render graphics at the client device. Players may be configured to request or retrieve manager ID 854, for use in identifying graphics rendering manager 524A to real-time graphics rendering application 101, as described herein.

In some embodiments, block 912 may comprise retrieving or requesting, by an installed graphics rendering manager 524A, device properties for devices in local network 800. Graphics rendering manager 524A may then select devices for installation of local clients and graphics rendering intermediaries, and graphics rendering manager 524A may install or facilitate installation of local clients and graphics rendering intermediaries at the selected devices. Graphics rendering manager 524A may similarly install or facilitate installation of players at potential client devices. Block 912 may be followed by block 913.

At "Model Store Manager" block 913, graphics rendering manager 524A may configure model store 121 within local network 800. For example, graphics rendering manager 524A may determine appropriate location(s) within local network 800 for model store 121. Appropriate locations may generally comprise locations accessible by all graphics rendering intermediaries in local network 800, having sufficient capacity to store models 151, and having sufficient speed to support providing models 151 to graphics rendering intermediaries during real-time graphics rendering. Graphics rendering manager 524A may optionally communicate with other devices 802, 803 to mirror model store 121 at multiple devices, or distribute model store 121 across multiple devices. Graphics rendering manager 524A may communicate with real-time graphics application 101 to initiate network model delivery, so that models 151 are available at local network 800 in advance of real-time graphics rendering demands. Graphics rendering manager 524A may also notify graphics rendering intermediaries 122A, 122B, and 122C of the location(s) of model store 121 at local network 800, so that graphics rendering intermediaries 122A, 122B, and 122C may make use of model store 121 in connection with intermediary graphics rendering. Block 913 may be followed by block 914.

Figure 10:
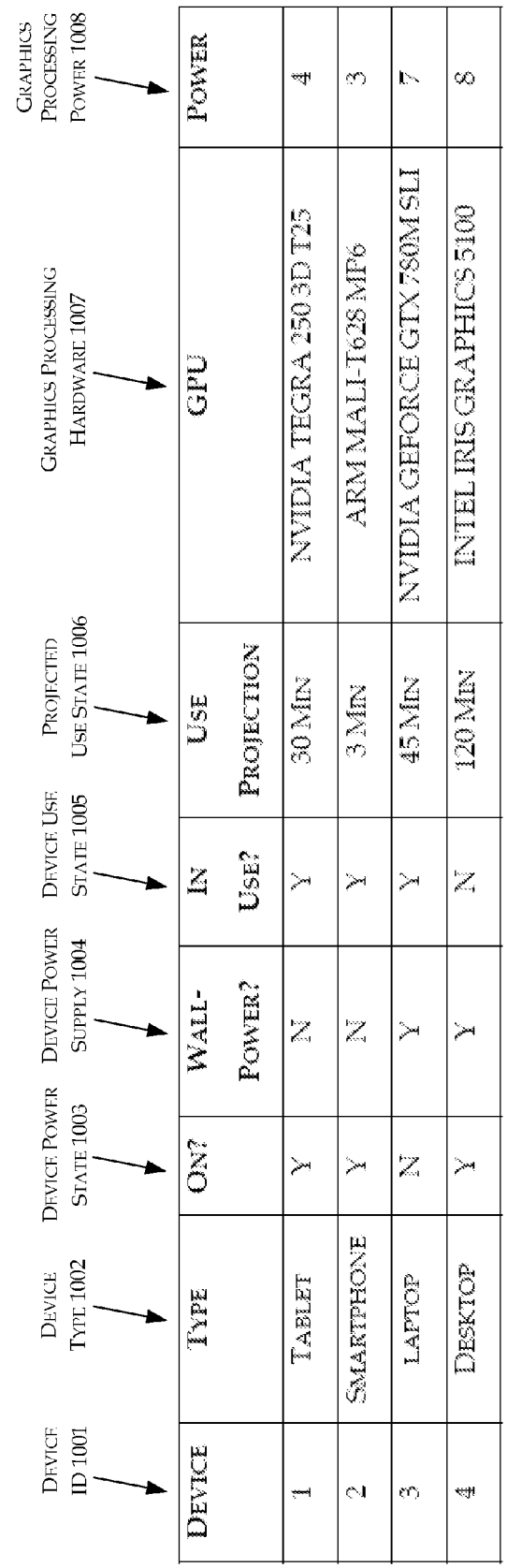
FIG. 10 is an example graphics processing capability table comprising collected graphics processing capability information.

At "Collect Graphics Processing Capability Information" block 914, graphics rendering manager 524A may collect graphics processing capability information from each device in local network 800 that is equipped to serve as a graphics rendering intermediary. Block 914 may comprise interacting with local clients 523A, 523B, and 523C. Local clients 523A, 523B, and 523C may be configured to provide graphics processing capability information to graphics rendering manager 524A. Collected graphics processing capability information may comprise any information that may be useful to select a graphics rendering intermediary in local network 800. Graphics rendering manager 524A may store collected graphics processing capability information, e.g., in a table or other data structure. FIG. 10 provides an example graphics processing capability table.

FIG. 10 is an example graphics processing capability table comprising collected graphics processing capability information, arranged in accordance with at least some embodiments of the present disclosure. Graphics processing capability table 1000 includes rows for example devices in a local network, and columns for graphics processing capability information collected for each device. The example graphics processing capability table 1000 includes four rows and 8 columns, however, it will be appreciated that more or fewer rows may be used for more or fewer devices, and more or fewer columns may be used to include more or less graphics processing capability information. The comprising collected graphics processing capability information in FIG. 10 is for an example local network which is not necessarily local network 800, however it will be appreciated that similar graphics processing capability information may be collected for the devices of local network 800.

Graphics processing capability table 1000 includes four example devices, identified in a Device ID column 1001 as devices 1, 2, 3 and 4. Additionally, graphics processing capability table 1000 includes a device type column 1002, a device power state column 1003, a device power supply column 1004, a device use state column 1005, a projected use state column 1006, a graphics processing hardware column 1007, and a graphics processing power column 1008, each column comprising collected graphics processing capability information for devices 1, 2, 3 and 4.

Device type 1002 may comprise, e.g., tablet, smartphone, laptop, desktop, or other device type. Device power state 1003 may comprise, e.g., an indication of whether a device is on or off. Device power supply 1004 may comprise, e.g., an indication of whether a device is connected to wall power. Device use state 1005 may comprise, e.g., an indication of whether a device is in use. Projected user state 1006 may comprise, e.g., an indication of whether and/or when a device is projected to be in use, based on historical device use patterns. Graphics processing hardware 1008 may comprise, e.g., an identification of make and model number of a GPU included in a device. Graphics processing power 1008 may comprise, e.g., an indication of relative graphics processing power of a device.

Returning now to block 914 in FIG. 9, in some embodiments, graphics rendering manager 524A may collect graphics processing capability information from local clients 523A, 523B, and 523C, e.g., by sending requests to local clients 523A, 523B, and 523C, and receiving and storing graphics processing capability information returned in response to such requests. In some embodiments, graphics rendering manager 524A may collect graphics processing capability information by receiving graphics processing capability information updates initiated from local clients 523A, 523B, and 523C.

Local clients 523A, 523B, and 523C may be adapted to query device operating systems and/or device hardware to collect some graphics processing capability information, e.g., device type 1002, device power state 1003, device power supply 1004, device use state 1005, and/or graphics processing hardware 1007. In some embodiments, local clients 523A, 523B, and 523C may be adapted to determine graphics processing capability information, e.g., by tracking device use patterns over time to determine device use patterns, and calculating projected use state 1006 based on the device use patterns.

In some embodiments, some or all of the operations described herein for block 914 may be omitted from block 910, and may be performed instead as part of intermediary selection, e.g., at block 922. Block 914 may be followed by block 915.

At "Determine Graphics Processing Power of Devices in Local Network" block 915, graphics rendering manager 524A may determine graphics processing powers of devices 801, 802, 803 in local network 800. For example, in some embodiments, graphics rendering manager 524A may request local clients 523A, 523B, and 523C to conduct graphics processing power tests. Local clients 523A, 523B, and 523C may be configured to conduct the graphics processing power tests and may use test results to assign a graphics processing power level from 1-10, with 1 being a slow/poor performance, and 10 being a fast/high performance. Local clients 523A, 523B, and 523C may be configured to return graphics processing power to graphics rendering manager 524A for inclusion in collected graphics processing capability information.

In some embodiments, graphics rendering manager 524A may determine graphics processing powers of devices 801, 802, 803 in local network 800 based on collected device graphics processing hardware information 1007. For example, graphics rendering manager 524A may access a database or list of graphics processing hardware and associated graphics processing power levels. Graphics rendering manager 524A may look up graphics processing power levels using graphics processing hardware information 1007 listed for each device in graphics processing capability table 1000. Graphics rendering manager 524A may be configured to assign graphics processing power levels from the list to each device in the graphics processing capability table 1000. The list of graphics processing hardware and associated graphics processing power may be included in information installed at computing device 801 along with graphics rendering manager 524A, or may be maintained, e.g., at system controller 324 as a web service or otherwise as information accessible by graphics rendering manager 524A.

In some embodiments, graphics rendering manager 524A may determine graphics processing powers of devices 801, 802, 803 in local network 800 based on collected device graphics processing hardware information 1007 by evaluating properties of graphics processing hardware information 1007. For example, graphics processing hardware information 1007 may indicate a number of processing cores in a GPU, a clock speed for a GPU, an amount of memory available to a GPU, a resolution level of a GPU, and/or a texture fill rate of a GPU. Graphics rendering manager 524A may evaluate these or other properties to determine graphics processing powers of devices 801, 802, 803.

"Intermediary Selection" block 920 may comprise, inter alia, a "Receive Request" block 921, a "Collect Graphics Processing Capability Information" block 922, a "Select Intermediary Computing Device(s)" block 923, and a "Respond to Request/Direct Compositing Flow to Selected Computing Device" block 924. Graphics rendering manager 524A may perform intermediary selection operations at block 920 in connection with each new session between a client device, such as client device 831, and a real time graphics application, such as real-time graphics application 101.

At "Receive Request" block 921, graphics rendering manager 524A may receive request 852 to initiate intermediary graphics rendering for a client, e.g., client device 831 in local network 800. Block 921 may be followed by block 922.

At "Collect Graphics Processing Capability Information" block 922, graphics rendering manager 524A may perform some or all of the operations described above in connection with block 914. In some embodiments, collection of graphics processing capability information at block 922 may depend on the age of any prior collected information. For example, device power state 1003, device power supply 1004, device use state 1005, and projected use state 1006 may be refreshed at block 922 if older than a predetermined age. The predetermined age may comprise, e.g., an age between one minute and two hours. Device type 1002, graphics processing hardware 1007, and graphics processing power 1008 are generally stable and unchanging and so need not be refreshed at block 922 in some embodiments. Block 922 may be followed by block 923.

At "Select Intermediary Computing Device(s)" block 923, graphics rendering manager 524A may select, based on collected graphics processing capability information, a computing device from among the computing devices in local network 800 to serve as an intermediary computing device to conduct intermediary graphics rendering for client device 831. In some embodiments, intermediary selection may be conducted according to one or more intermediary selection rules. The intermediary selection rules may be applied to collected graphics processing capability information. Any desired intermediary selection rules may be applied to ensure selection of a computing device that is capable of serving as an intermediary computing device. In some embodiments, request 852 may include intermediary selection rules to be applied by graphics rendering manager 524A, and graphics rendering manager 524A may be configured to apply the intermediary selection rules included in request 852. In some embodiments, graphics rendering manager 524A may have a default set of intermediary selection rules to be applied for all requests.

For example, in some embodiments graphics rendering manager 524A may apply intermediary selection rules specifying that the selected computing device has a device power state 1003 which is on; that the selected computing device has a device use state 1005 which is not in use; that the selected computing device has a projected use state 1006 which is no projected use for a projected time period; that the selected computing device has device power supply information 1004 indicating that the selected device is connected to wall power; and/or that the selected computing device has device graphics processing power 1008 meeting or exceeding a threshold graphics processing power. Intermediary selection rules may be implemented as requirements and/or as device selection preferences.

An intermediary selection rule specifying selection of a computing device which has a projected use state 1006 which is no projected use for a projected time period may be implemented in a variety of ways. In an example based on FIG. 10, projected use state 1006 may indicate a projected time period during which a current device use state 1005 is projected to continue. Thus device 1 is in use and projected to remain in use for 30 minutes, device 2 is in use and projected to remain in use for 3 minutes, device 3 is in use and projected to remain in use for 45 minutes, and device 4 is not in use and projected to remain in not in use for 120 minutes. An intermediary selection rule specifying, e.g., no projected use for a projected time period of 30 minutes may eliminate all but device 4 as available intermediary computing devices. Alternatively, such a rule may create a preference for device 4 over the other devices, e.g., by applying a preference weight in a preference-based selection approach. It will be appreciated that there are many variations and modifications which may be applied to such an intermediary selection rule.

An intermediary selection rule specifying selection of a computing device which meets or exceeds a threshold graphics processing power may be implemented in a variety of ways. In an example based on FIG. 10, a threshold graphics processing power may be set at any desired power from 1-10. Devices scored at or above the threshold power may be available as intermediary computing devices, while devices scored below the threshold power may be eliminated as available intermediary computing devices. Thus for example if a threshold graphics processing power is set at 6, devices 1 and 2 may be eliminated while devices 3 and 4 may remain available as intermediary computing devices. Alternatively, a preference may be indicated for devices 3 and 4 over devices 1 and 2, by applying a preference weight in a preference-based selection approach. It will be appreciated that there are many variations and modifications which may be applied to such an intermediary selection rule.

In some embodiments, graphics rendering manager 524A may select, at block 923, based on the collected graphics processing capability information, a backup computing device from among the computing devices in local network 800 to serve as a backup intermediary computing device to conduct intermediary graphics rendering for the client device 831 when the selected computing device is unavailable for intermediary graphics rendering. In some embodiments, a set of intermediary selection rules used to select the backup computing device may be the same or similar to the set of intermediary selection rules used to select the selected computing device.

In some embodiments, graphics rendering manager 524A may select, at block 923, based on the collected graphics processing capability information, one or more selected computing devices from among the computing devices in local network 800. Graphics rendering manager 524A may send collected graphics processing capability information for the one or more selected computing devices to real-time graphics application 101, allowing real-time graphics application 101 to determine which if any of the one or more selected computing devices to use as an intermediary computing device. Graphics rendering manager 524A may use a set of intermediary selection rules, as described herein, to select the one or more selected computing devices identified to real-time graphics application 101. Block 923 may be followed by block 924.

At "Respond to Request/Direct Compositing Flow to Selected Computing Device" block 924, graphics rendering manager 524A may send a response to the request received at block 921. When the response indicates no graphics rendering capability at local network 800, real time graphics application 101 may be configured to render graphics outside of local network 800. When the response indicates graphics rendering capability at local network 800, the response may be effective to direct compositing flow 154 to the computing device selected at block 923, to enable the selected computing device to render graphics for delivery to client device 831.

The response may for example identify selected computing device 802 to real-time graphics application 101 so that real-time graphics application 101 may send compositing flow 154 to selected computing device 802, e.g. directly to selected computing device 802, or indirectly to selected computing device 802 via device 801 comprising graphics rendering manager 524A. In some embodiments, the response may indicate graphics rendering capability at local network 800, without necessarily identifying selected computing device 802 to real-time graphics application 101, and graphics rendering manager 524A may configure computing device 801 to forward compositing flow 154 from real-time graphics application 101 to selected computing device 802. In some embodiments, the response may comprise graphics processing capability information for one or more selected computing devices, e.g., for devices 801, 802, and/or 803, allowing graphics application 101 to determine which (if any) of the one or more selected computing devices to use as an intermediary computing device.

Figure 11:
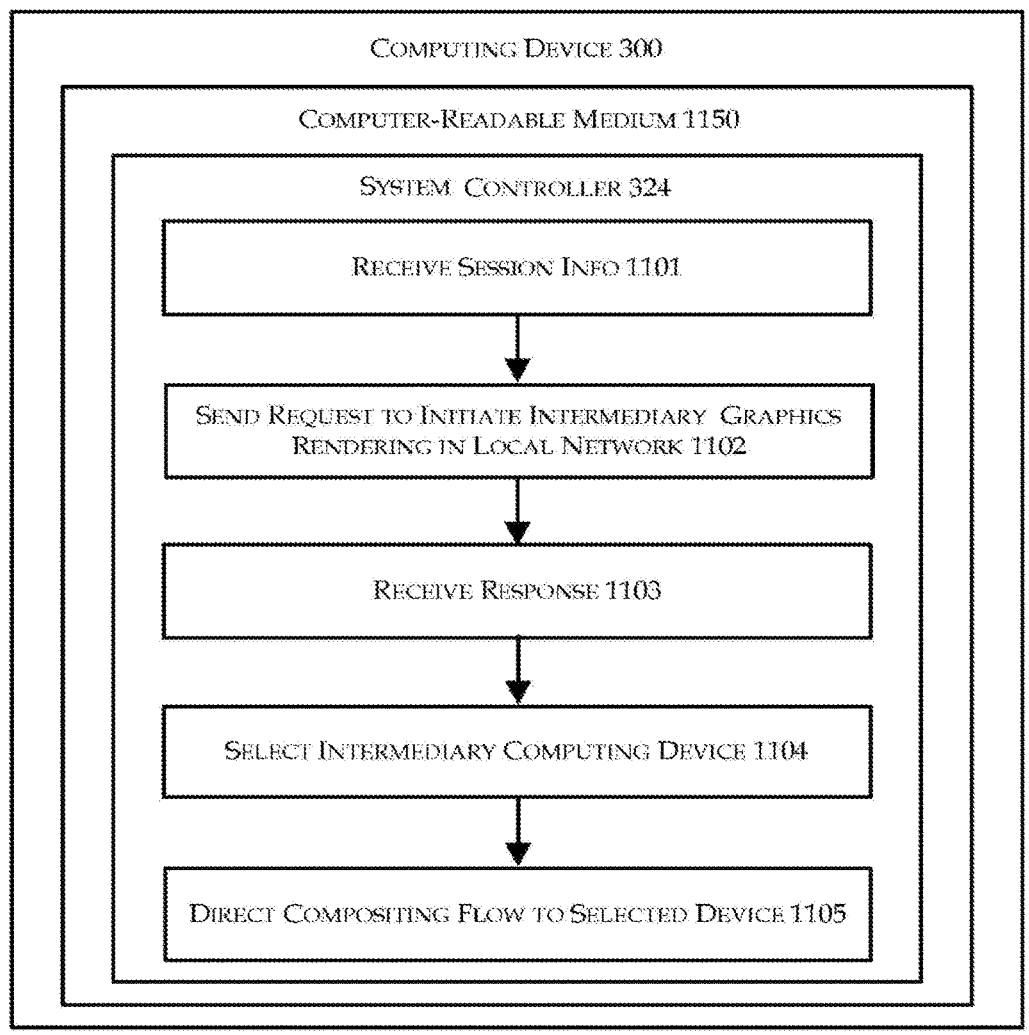
FIG. 11 is a flow diagram of example methods for determining, by a system controller, an intermediary computing device to conduct intermediary graphics rendering at a local network.

FIG. 11 is a flow diagram of example methods for determining, by a system controller, an intermediary computing device to conduct intermediary graphics rendering at a local network, arranged in accordance with at least some embodiments of the present disclosure. The example flow diagram may include one or more operations/modules as illustrated by blocks 1101-1105, which represent operations as may be performed by system controller 324, functional modules in computing device 300, and/or instructions as may be recorded on a computer readable medium 1150.

In FIG. 11, blocks 1101-1105 are illustrated as including blocks being performed sequentially, e.g., with block 1101 first and block 1105 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

In FIG. 11, system controller 324 may operate in cooperation with intermediary selection module 323, real-time graphics application 101, client device 831, and/or graphics rendering manager 524A to ascertain whether intermediary graphics rendering can be conducted by a device within local network 800. System controller 324 may for example be adapted in real-time graphics application 101 to support network delivery of video game and other real-time rendered graphics to client devices via local network intermediary computing devices.

At a "Receive Session Info" block 1101, system controller 324 may receive session information 851 from client device 831. In some embodiments, session information 851 may be sent from client device 831 to real-time graphics application 101, and real-time graphics application 101 may initiate system controller 324 and provide session information 851 to system controller 324. As noted herein, in some embodiments session information 851 may include manager ID 854 identifying graphics rendering manager 524A. In some embodiments session information 851 may include other information, such as an identification of client device 831, player 835, or a user of client device 831, and system controller 324 may use such included information to look up information identifying graphics rendering manager 524A. Block 1101 may be followed by block 1102.

At a "Send Request to Initiate Intermediary Graphics Rendering in Local Network" block 1102, system controller 324 may send request 852 to graphics rendering manager 524A. Request 852 may comprise a request to initiate intermediary graphics rendering in local network 800 for client device 831. Request 852 may identify client device 831, and request 852 may optionally include intermediary selection rules to be applied in selecting an intermediary computing device. In some embodiments, additional steps may be employed, e.g., a discovery step to determine graphics rendering capability at local network 800 may be employed prior to requesting intermediary graphics rendering in local network 800. Block 1102 may be followed by block 1103.

At a "Receive Response" block 1103, system controller 324 may receive response 853. In some embodiments, response 853 may comprise an identification of selected computing device 802 in local network 800. Selected computing device 802 may be selected, e.g., by graphics rendering manager 524A to serve as an intermediary computing device to conduct intermediary graphics rendering for client device 831.

In some embodiments, response 853 may comprise an indication of graphics processing capability at local network 800, without necessarily identifying selected computing device 802. When system controller 324 selects local network 800 for intermediary graphics processing, e.g., based on the indication of graphics processing capability at local network 800, system controller 324 may cause real-time application 101 to send compositing flow 154 to graphics rendering manager 524A for forwarding by graphics rendering manager 524A to a selected device within local network 800.

In some embodiments, response 853 may indicate no graphics processing capability at local network 800, or graphics processing capability at local network 800 that system controller 324 may be determine to be insufficient to support real-time graphics rendering demands. In response to an indication of no graphics processing capability at local network 800, system controller 324 may cause real-time graphics application 101 to render graphics outside of local network 800.

In some embodiments, response 853 may include additional information, such as an identification of backup computing device 801 in local network 800, and/or collected graphics processing capability information of one or more selected computing devices in local network 800. System controller 324 may receive and apply such additional information at block 1104. Block 1103 may be followed by block 1104.

At a "Select Intermediary Computing Device" block 1104, system controller 324 may operate in cooperation with intermediary selection module 323 to select an appropriate intermediary computing device for use by real-time graphics application 101. In some embodiments, system controller 324 may select, at block 1104, selected computing device 802 as identified by graphics rendering manager 524A as the intermediary computing device.

In some embodiments, system controller 324 and/or intermediary selection module 323 may compare graphics processing and delivery capabilities at local network 800 with graphics processing and delivery capabilities at other intermediary computing devices, such as CDN server 860. Block 1104 may comprise selecting an intermediary computing device based on comparison results and/or order of preference, e.g., by selecting an intermediary computing device that meets any threshold graphics processing power criteria and/or any criteria for the length of "short" network connection 162, according to an order of preference implemented at system controller 324.

In some embodiments, system controller 324 may receive, at block 1103, collected graphics processing capability information of one or more selected computing devices in local network 800, as described herein. The one or more selected computing devices may be pre-selected, e.g., by graphics rendering manager 524A. Block 1104 may comprise selecting, based on the collected graphics processing capability information, a computing device to serve as the intermediary computing device. Block 1104 may include, e.g., determining a graphics processing power of the one or more selected computing devices in local network 800 based on device graphics processing hardware information 1007. Selection of the computing device to serve as the intermediary computing device may be based at least in part on determined graphics processing power. Block 1104 may be followed by block 1105.

At a "Direct Compositing Flow to Selected Device" block 1105, system controller 324 may direct compositing flow 154 comprising model identifiers and model rendering information to selected computing device 802 to enable selected computing device 802 to render graphics for delivery to client device 831. In some embodiments, system controller 324 may identify selected computing device 802 as selected intermediary 854 to real-time graphics application 101, thereby causing real-time graphics application 101 to direct compositing flow 154 to selected computing device 802. In some embodiments, system controller 324 may identify computing device 801 as selected intermediary 854 to real-time graphics application 101, thereby causing real-time graphics application 101 to direct compositing flow 154 to computing device 801, wherein computing device 801 may be adapted to forward compositing flow 154 to selected computing device 802.

In some embodiments, system controller 324 may direct compositing flow 154 to an identified backup computing device in local network 800. For example, device 801 may be identified as a backup computing device in response 853, to enable the backup computing device to render graphics for delivery to the client device 831. System controller 324 may direct compositing flow 154 to backup computing device 801 when selected computing device 802 is unavailable to serve as an intermediary computing device. In some embodiments, system controller 324 may be notified by client device 831 and/or graphics rendering manager 524A that selected computing device 802 is unavailable or experiencing high latency or other errors. System controller 324 may direct compositing flow 154 to backup computing device 801 in response to such notification.

Furthermore, system controller 324 may switch to a remote graphics rendering mode comprising graphics rendering by a computing device outside local network 800 when selected computing device 802 and/or any backup computing devices in local network 800 are unavailable. For example, system controller 324 may notify intermediary selection module 323 of the unavailability of intermediary computing devices in local network 800. Intermediary selection module 323 may select CDN server 860 or another computing device outside local network 800, and intermediary selection module 323 may update selected intermediary 854 for use by real-time graphics application 101. In the event that no intermediary computing devices are available for use by real-time graphics application 101, real-time graphics application 101 may switch to rendering graphics locally at the datacenter comprising server computing device 100.

Figure 12:
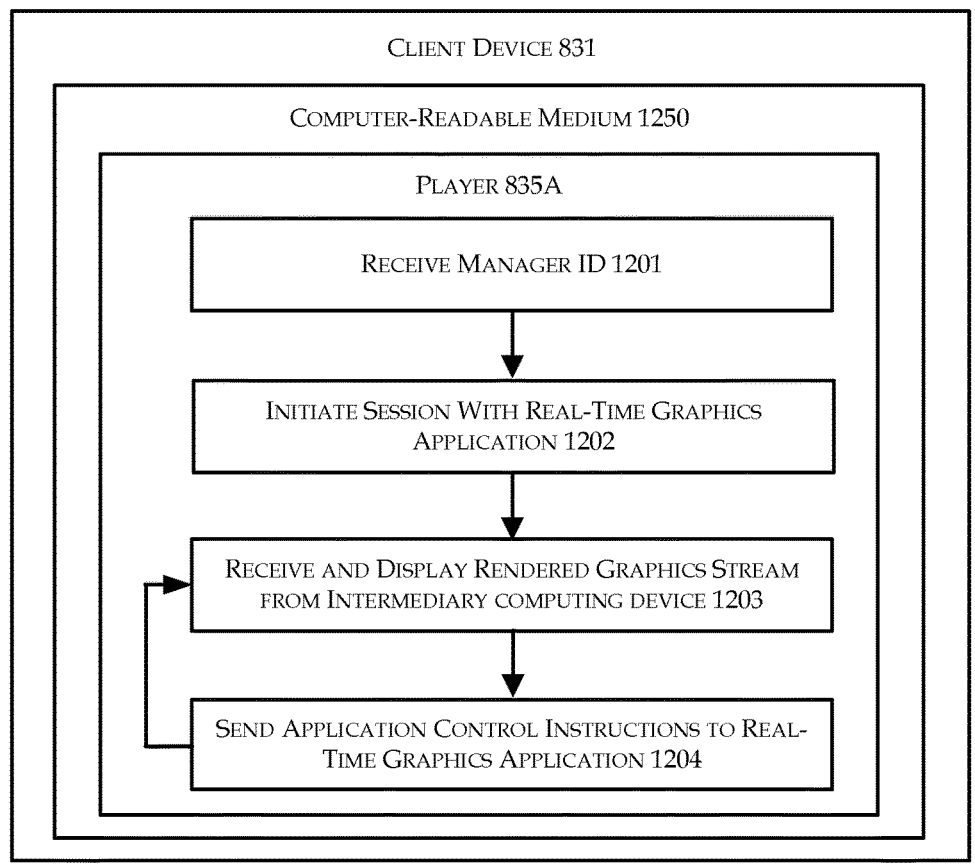
FIG. 12 is a flow diagram of example methods for engaging, by a client device, in a communications session comprising graphics delivery by an intermediary computing device, all arranged in accordance with at least some embodiments of the present disclosure.

FIG. 12 is a flow diagram of example methods for engaging, by a client device, in a communications session comprising graphics delivery by an intermediary computing device, arranged in accordance with at least some embodiments of the present disclosure. The example flow diagram may include one or more operations/modules as illustrated by blocks 1201-1204, which represent operations as may be performed by player 835A, functional modules in client device 831, and/or instructions as may be recorded on a computer readable medium 1250.

In FIG. 12, blocks 1201-1104 are illustrated as including blocks being performed sequentially, e.g., with block 1201 first and block 1204 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

In FIG. 12, player 835A may operate in cooperation with graphics rendering manager 524A, real-time graphics application 101, system controller 324, and/or a selected intermediary computing device within local network 800 to initiate and conduct a communication session with real-time graphics application 101. In the communication session, player 835A may receive and display a rendered graphics stream from an intermediary computing device within local network 800 while sending application control instructions to real-time graphics application 101.

At a "Receive manager ID" block 1201, player 835A may receive manager ID 854 from graphics rendering manager 524A. Player 835A may store manager ID 854 for use in establishing communication sessions with real-time graphics application 101. Block 1201 may be followed by block 1202.

At an "Initiate Session with Real-Time Graphics Application" block 1202, player 835A may initiate a communication session with real-time graphics application 101, e.g., by carrying out various network protocols as appropriate to connect to real-time graphics application 101 via the Internet. Player 835A may send session information 851 to real-time graphics application 101. Session information 851 may optionally identify client device 831, the user at client device 831, player 835A, and/or graphics rendering manager 524A. Graphics rendering manager 524A may be identified, e.g., by manager ID 854 as provided to player 835A at block 1201. Block 1202 may be followed by block 1203.

At a "Receive and Display Rendered Graphics Stream from Intermediary Computing Device" block 1203, player 835A may receive rendered graphics stream 158 from selected computing device 802. In some embodiments, selected computing device 802 may identify rendered graphics stream 158 to player 835A as applicable in the context of the session between player 835A and real-time graphics application 101. Player 835A may decompress and display rendered graphics stream 158 at client device 831. Block 1203 may be followed by block 1204.

At a "Send Application Control Instructions to Real-Time Graphics Application" block 1204, player 835A may send application control instructions 152 to real-time graphics application 101, as described herein. An arrow from block 1204 to block 1203 indicates that player 835A may continue sending application control instructions 152 to real-time graphics application 101, and player 835A may continue receiving and displaying rendered graphics stream 158 from selected computing device 802, for the duration of the communication session with real-time graphics application 101. Player 835A may thus be adapted to simultaneously interact with two devices. Player 835A receives rendered graphics stream 158 from selected computing device 802, while simultaneously receiving and sending application control instructions 152 to real-time graphics application 101 at server computing device 100.

In some embodiments, player 835A may detect latency or errors in rendered graphics stream 158, and player 835A may notify real-time graphics application 101 of such detected latency or errors, while continuing to send application control instructions 152. Block 1203 may comprise receiving and displaying rendered graphics stream 158 from a newly selected computing device, e.g., a backup computing device inside or outside of local network 800, while player 835A continues to send application control instructions 152 to real-time graphics application 101.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to manage intermediary graphics rendering in a local network, the method comprising:
   collecting, by a graphics rendering manager in the local network, graphics processing capability information of each of one or more computing devices in the local network;
   receiving, by the graphics rendering manager, a request from a server located outside the local network to initiate the intermediary graphics rendering for a client in the local network;
   sending, by the graphics rendering manager, a response to the request to initiate the intermediary graphics rendering, wherein the response indicates intermediary graphics rendering capability at the local network;
   selecting, by the graphics rendering manager, based on the collected graphics processing capability information, a computing device from among the one or more computing devices in the local network to serve as an intermediary computing device to conduct the intermediary graphics rendering for the client; and
   directing, by the graphics rendering manager, an initial compositing flow received from the server located outside the local network to the selected computing device to enable the selected computing device to render graphics for delivery to the client, wherein the initial compositing flow comprises model identifiers and model rendering information, wherein the model identifiers identify models in a model store within the local network, wherein the selected computing device renders graphics for delivery to the client by at least having the models positioned according to the model rendering information, and wherein a subsequent compositing flow received from the server located outside the local network excludes one or more models previously sent to the selected computing device.

2. A non-transitory computer readable storage medium having stored thereon computer executable instructions executable by a processor, wherein the computer executable instructions, in response to execution by the processor, implement a graphics rendering manager which causes the processor to perform or control performance of operations to:
   collect graphics processing capability information of each of one or more computing devices in a local network;
   identify a request from a server located outside the local network to initiate intermediary graphics rendering for a client in the local network;

send a response to the request to initiate the intermediary graphics rendering, wherein the response indicates intermediary graphics rendering capability at the local network;

select, based on the collected graphics processing capability information, a computing device from among the one or more computing devices in the local network to serve as an intermediary computing device to conduct the intermediary graphics rendering for the client; and direct an initial compositing flow, received from the server located outside the local network, to the selected computing device to enable the selected computing device to render graphics for delivery to the client, wherein the initial compositing flow comprises model identifiers and model rendering information, wherein the model identifiers identify models in a model store within the local network, wherein the selected computing device renders the graphics for delivery to the client by at least having the models positioned according to the model rendering information, and wherein a subsequent compositing flow received from the server located outside the local network excludes one or more models previously sent to the selected computing device.

3. The non-transitory computer readable storage medium of claim 2, wherein the collected graphics processing capability information comprises one or more of: device type information, device graphics processing power information, device use state information, device power state information, or device power supply information.

4. The non-transitory computer readable storage medium of claim 3, wherein the collected graphics processing capability information for the selected computing device includes the device power state information which indicates that the selected computing device is on.

5. The non-transitory computer readable storage medium of claim 3, wherein the collected graphics processing capability information for the selected computing device includes the device use state information which indicates that the selected computing device is not in use.

6. The non-transitory computer readable storage medium of claim 3, wherein the collected graphics processing capability information for the selected computing device includes a projected use state which indicates that there is no projected use of the selected computing device for a projected time period.

7. The non-transitory computer readable storage medium of claim 3, wherein the collected graphics processing capability information for the selected computing device includes the device power supply information which indicates that the selected computing device is connected to wall power.

8. The non-transitory computer readable storage medium of claim 3, wherein the collected graphics processing capability information for the selected computing device includes the device graphics processing power information which indicates that the selected computing device meets or exceeds a threshold graphics processing power.

9. The non-transitory computer readable storage medium of claim 2, wherein the collected graphics processing capability information comprises device graphics processing hardware information, and wherein the graphics rendering manager further causes the processor to perform or control performance of an operation to:

determine a graphics processing power of the one or more computing devices in the local network based on the device graphics processing hardware information, wherein the selection of the computing device to serve as the intermediary computing device is based on the determined graphics processing power of the one or more computing devices in the local network.

10. The non-transitory computer readable storage medium of claim 2, wherein the graphics rendering manager further causes the processor to perform or control performance of an operation to:

select, based on the collected graphics processing capability information, a backup computing device from among the one or more computing devices in the local network to serve as a backup intermediary computing device to conduct the intermediary graphics rendering for the client when the selected computing device is unavailable for the intermediary graphics rendering.

11. The non-transitory computer readable storage medium of claim 2, wherein to collect the graphics processing capability information, the graphics rendering manager causes the processor to perform or control performance of an operation to:

interact with one or more local client modules at the one or more computing devices in the local network, wherein each of the one or more computing devices in the local network comprises a local client module configured to provide the graphics processing capability information to the graphics rendering manager.

12. A graphics rendering manager device adapted to manage intermediary graphics rendering in a local network, the graphics rendering manager device comprising:

a processor;

a memory coupled to the processor; and a graphics rendering manager stored in the memory and executable by the processor, wherein the graphics rendering manager is configured to:

collect graphics processing capability information of each of one or more computing devices in a local network;

receive a request from a server located outside the local network to initiate the intermediary graphics rendering for a client in the local network;

send a response to the request to initiate the intermediary graphics rendering, wherein the response indicates intermediary graphics rendering capability at the local network;

select, based on the collected graphics processing capability information, a computing device from among the one or more computing devices in the local network to serve as an intermediary computing device to conduct the intermediary graphics rendering for the client; and direct an initial compositing flow received from the server located outside the local network to the selected computing device to enable the selected computing device to render graphics for delivery to the client, wherein the initial compositing flow comprises model identifiers and model rendering information, wherein the model identifiers identify models in a model store within the local network, wherein the selected computing device renders the graphics for delivery to the client by at least having the models positioned according to the model rendering information, and wherein a subsequent compositing flow received from the server located outside the local network excludes one or more models previously sent to the selected computing device.

13. The graphics rendering manager device of claim 12, wherein the collected graphics processing capability information comprises one or more of: device type information, device graphics processing power information, device use state information, device power state information, or device power supply information.

14. The graphics rendering manager device of claim 13, wherein the collected graphics processing capability information for the selected computing device includes the device power state information which indicates that the selected computing device is on and the device use state information which indicates the selected computing device is not in use.

15. The graphics rendering manager device of claim 13, wherein the collected graphics processing capability information for the selected computing device includes a projected use state which indicates that there is no projected use of the selected computing device for a projected time period.

16. The graphics rendering manager device of claim 13, wherein the collected graphics processing capability information for the selected computing device includes the device power supply information which indicates that the selected computing device is connected to wall power.

17. The graphics rendering manager device of claim 13, wherein the collected graphics processing capability information for the selected computing device includes the device graphics processing power information which indicates that the selected computing device meets or exceeds a threshold graphics processing power.

18. The graphics rendering manager device of claim 12, wherein the collected graphics processing capability information comprises device graphics processing hardware information, and wherein the graphics rendering manager is configured to:
   determine a graphics processing power of the one or more computing devices in the local network based on the device graphics processing hardware information, wherein the selection of the computing device to serve as the intermediary computing device is based on the determined graphics processing power of the one or more computing devices in the local network.

19. The graphics rendering manager device of claim 12, wherein the graphics rendering manager is configured to:
   select, based on collected graphics processing capability information, a backup computing device from among the computing devices in the local network to serve as a backup intermediary computing device to conduct the intermediary graphics rendering for the client when the selected computing device is unavailable for the intermediary graphics rendering.

20. The graphics rendering manager device of claim 12, wherein to collect the graphics processing capability information, the graphics rendering manager is configured to interact with one or more local client modules at the one or more computing devices in the local network, and wherein each of the one or more computing devices in the local network comprises a local client module configured to provide the graphics processing capability information to the graphics rendering manager.

* * * * *

UNITED STATES PATENT AND TRADEMARK OFFICE
CERTIFICATE OF CORRECTION

PATENT NO. : 9,779,463 B2  
APPLICATION NO. : 14/380908  
DATED : October 3, 2017  
INVENTOR(S) : Fine et al.

Page 1 of 1

It is certified that error appears in the above-identified patent and that said Letters Patent is hereby corrected as shown below:

In the Specification

In Column 4, Line 23, delete "stream," and insert -- stream; --, therefor.

In Column 10, Line 65, delete "modes 156," and insert -- models 156, --, therefor.

In Column 12, Line 67, delete "Thus for" and insert -- Thus, for --, therefor.

In Column 14, Line 52, delete "(DSP Core)," and insert -- (DSP core), --, therefor.

In Column 14, Line 54, delete "implementations the" and insert -- implementations, the --, therefor.

In Column 17, Line 35, delete "a long" and insert -- a "long" --, therefor.

In Column 20, Line 43, delete "implementations the" and insert -- implementations, the --, therefor.

In Column 44, Line 19, delete "and or" and insert -- and/or --, therefor.

In Column 44, Line 30, delete "hard disk drive," and insert -- hard disk drive (HDD), --, therefor.

In Column 44, Line 34, delete "communications link," and insert -- communication link, --, therefor.

In Column 45, Line 31, delete "recitation no" and insert -- recitation, no --, therefor.

In Column 45, Line 53, delete "general such" and insert -- general, such --, therefor.

In Column 45, Line 61, delete "general such" and insert -- general, such --, therefor.

Signed and Sealed this  
First Day of May, 2018

Andrei Iancu  
*Director of the United States Patent and Trademark Office*